(12) United States Patent
Hybertson

(10) Patent No.: US 9,485,526 B2
(45) Date of Patent: Nov. 1, 2016

(54) MULTI-STREAM SHARED COMMUNICATION CHANNELS

(75) Inventor: Eric D. Hybertson, Longmont, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 989 days.

(21) Appl. No.: 13/550,359

(22) Filed: Jul. 16, 2012

(65) Prior Publication Data

US 2014/0020037 A1 Jan. 16, 2014

(51) Int. Cl.
*H04N 21/23* (2011.01)
*H04N 21/2365* (2011.01)

(52) U.S. Cl.
CPC .................. *H04N 21/2365* (2013.01)

(58) Field of Classification Search
CPC ........... H04N 7/17345; H04N 7/17318; H04N 12/28; H04N 21/23439; H04N 21/2365; H04N 21/2387; H04N 21/25825; H04N 21/6587; H04N 21/4331; H04N 21/43615; H04N 21/6125; H04N 21/6336; H04N 21/6379; H04N 21/2668; H04L 29/06; H04L 29/12
See application file for complete search history.

(56) References Cited

U.S. PATENT DOCUMENTS

| | | | | |
|---|---|---|---|---|
| 5,822,676 A * | 10/1998 | Hayashi et al. | | 725/114 |
| 6,397,255 B1 * | 5/2002 | Nurenberg | | H04L 29/06 709/228 |
| 7,039,056 B2 * | 5/2006 | Brouwer | | H04L 12/6418 370/395.43 |
| 8,121,116 B1 * | 2/2012 | Healy | | H04L 47/564 370/235 |
| 2010/0011012 A1 * | 1/2010 | Rawson | | 707/101 |
| 2011/0096665 A1 * | 4/2011 | McCann | | H04L 47/10 370/235 |
| 2011/0302617 A1 * | 12/2011 | Greenfield | | H04N 21/2396 725/96 |
| 2012/0128061 A1 * | 5/2012 | Labrozzi | | H04N 21/234354 375/240.02 |
| 2012/0192230 A1 * | 7/2012 | Algie et al. | | 725/38 |
| 2013/0268961 A1 * | 10/2013 | Miles et al. | | 725/32 |
| 2014/0020034 A1 * | 1/2014 | Manchester et al. | | 725/86 |

* cited by examiner

*Primary Examiner* — Charles C Jiang
*Assistant Examiner* — Thad Defauw
(74) *Attorney, Agent, or Firm* — Chapin Intellectual Property Law, LLC

(57) ABSTRACT

By way of a non-limiting example, a server resource receives portions of a non-adaptive bit rate data stream. The server resource also receives portions of an adaptive bit rate data stream. The server resource interleaves the portions of the adaptive bit rate data stream and the portions of the non-adaptive bit rate data stream onto the multi-stream data channel. Thereafter, the server resource initiates transmission of the multi-stream data channel (which includes the adaptive bit rate data stream and the non-adaptive bit rate data stream) over a network such as a backbone or core network to a downstream resource such as a distribution resource. The distribution resource, in turn, transmits the adaptive bit rate data stream and the non-adaptive bit rate data stream to a group of multiple subscribers that have shared access to communication link in a cable network environment.

32 Claims, 14 Drawing Sheets

FOR TIERED CONTENT 112-1:

| ADAPTIVE BIT RATE | GROUP OF DATA | HORIZONTAL PIXEL COUNT | VERTICAL PIXEL COUNT | FRAME RATE UPDATE PER SECOND | PROFILE INFO | AUDIO BIT RATE (kbps) | VIDEO BIT RATE (Mbps) | TRANSPORT RATE (Mbps) | NETWORK ADDRESS |
|---|---|---|---|---|---|---|---|---|---|
| ABR1 | A | 1920 | 1080 | 30 | High, 4.1 | 96 | 6.23 | 6.32 | URL #1 |
| ABR2 | B | 1920 | 1080 | 30 | High, 4.1 | 96 | 4.98 | 5.07 | URL #2 |
| ABR3 | C | 1280 | 720 | 30 | Main, 3.1 | 96 | 4.42 | 4.52 | URL #3 |
| ABR4 | D | 1280 | 720 | 30 | Main, 3.1 | 96 | 3.32 | 3.41 | URL #4 |
| ABR5 | E | 1280 | 720 | 30 | Main, 3.1 | 96 | 2.76 | 2.86 | URL #5 |
| ABR6 | F | 960 | 540 | 30 | Main, 3.1 | 96 | 2.18 | 2.27 | URL #6 |
| ABR7 | G | 720 | 404 | 30 | Main, 3.0 | 96 | 1.57 | 1.67 | URL #7 |
| ABR8 | H | 640 | 360 | 30 | Main, 3.0 | 96 | 1.11 | 1.20 | URL #8 |
| ABR9 | I | 480 | 272 | 30 | Baseline | 96 | 0.98 | 1.08 | URL #9 |
| ABR10 | J | 320 | 180 | 30 | Baseline | 96 | 0.60 | 0.70 | URL #10 |

CONTENT ACCESS INFORMATION 122

FIG. 9

MULTI-STREAM SHARED COMMUNICATION CHANNELS

BACKGROUND

Conventional large cable networks comprise distributed video and data facilities to deliver content in a cable network environment. In a typical cable network, content such as videos are distributed over a backbone or core network to so-called headend resources that service one or more hubs. The hubs receive and re-distribute the content to one or more distribution nodes that each, in turn, conveys the content to a service group including multiple subscribers. The subscribers in the service group are able to tune to certain frequencies of the shared cable using a set-top box, cable modem, etc., to retrieve and play back desired content.

One conventional way to deliver video over a core network to the hubs is to produce a multi-program transport stream for transmission over a backbone of a network. The multi-program transport stream is typically a QAM (Quadrature Amplitude Modulation) data channel including multiple data streams. Subsequent to receiving the multi-program transport stream, a distribution node then initiates distribution of the data streams (e.g., variable bit rate or constant bit rate data streams) to the multiple subscribers in the service group.

One downside of continuously transmitting all available program channels over a shared cable medium to a service group is inefficient bandwidth usage. As an example, no subscribers in a service group may be tuned to play back a particular program, yet a data stream in a non-switched digital video application is continuously transmitted on the cable medium to the subscribers in the service group.

Conventional cable network applications sometimes support so-called switched digital video. In such applications, a data stream is transmitted on available bandwidth of a shared cable medium (e.g., a coaxial cable) to the members in a service group only after a particular subscriber makes a request (or tunes) to receive the data stream. Accordingly, in such switched digital video applications, if no subscriber requests to play back a data stream at a subscriber node in the service group, the data stream is not needlessly transmitted over the network to the service group in order to save on bandwidth.

BRIEF DESCRIPTION OF EMBODIMENTS

Conventional cable networks suffer from a number of deficiencies. For example, as mentioned, conventional cable networks typically generate one or more multi-program transport streams on which to transmit and subsequently distribute program content to members. As mentioned, each conventional multi-program transport stream supports conveyance of multiple streams of data. The content transmitted in each data stream of the conventional multi-program transport stream is encoded according to a known level of quality or bit rate over a duration of the data stream regardless of whether the bit rate of data stream is constant or variable.

To reserve bandwidth on a conventional multi-program transport stream for transmission of a respective data stream, the worst-case bit rate for each of the data streams (a variable bit rate data stream or a constant bit rate data stream) must be considered during allocation so that sufficient bandwidth is available to transmit all of the data streams. Invariably, this results in a substantial portion of unused bandwidth on the conventional multi-program transport stream because reservation of bandwidth to transmit a data stream accounts for the worst-case bit rate for the data stream. The worst-case bit rate may occur quite seldom. Thus, typically at least a portion of the multi-program transport stream is wasted according to conventional applications. Unused bandwidth in the conventional multi-program transport stream is typically filled up with null data.

In contrast to conventional methods, embodiments herein include unique ways to provide more efficient use of available bandwidth in a multi-stream data channel. For example, one embodiment herein includes combining at least one non-adaptive bit rate data stream and at least one adaptive bit rate data stream on a multi-stream data channel to ensure better efficiency of delivering content in a network environment. The level of quality of segments (e.g., packets) included in the adaptive bit rate data stream varies over time depending on availability of excess bandwidth on the multi-stream data channel.

As an example, in accordance with one embodiment, a server resource receives portions of a non-adaptive bit rate data stream. The server resource also receives portions of an adaptive bit rate data stream. The server resource interleaves the portions of the adaptive bit rate data stream and the portions of the non-adaptive bit rate data stream onto the multi-stream data channel. Thereafter, the server resource initiates transmission of the multi-stream data channel (which includes the adaptive bit rate data stream and the non-adaptive bit rate data stream) over a network such as a backbone or core network to a downstream resource such as a distribution resource. The distribution resource, (which may be referred to as an edge device that services a service group), in turn, transmits the adaptive bit rate data stream and the non-adaptive bit rate data stream (either on separate channels or as a re-transmitted multi-stream data channel) to a group of multiple subscribers that have shared access to communication link in a cable network environment.

In one embodiment, the multi-stream data channel is allocated as a multi-stream, switched digital video channel configured to convey switched digital content to the group of multiple subscribers in the cable network environment. In such an instance, the server resource and/or distribution resource initiates distribution of the adaptive bit rate data stream and the non-adaptive bit rate data stream as switched video content to each subscriber in the group of multiple subscribers in the cable network environment in response to at least one of the subscribers in the group requesting to retrieve the adaptive bit rate data stream. A so-called gateway processing resource in a subscriber domain can be configured to receive the multi-stream data channel and process the received multi-stream data channel to produce one or more unicast streams. The gateway resource forwards the one or more unicast streams to one or more subscriber devices in the subscriber domain. Thus, in accordance with embodiments herein, each recipient in a cable network environment can include one or more processing resources that translate the multicast transmitted content (e.g., adaptive bit rate transmitted content and/or non-adaptive bit rate content) received on the multi-stream data channel into unicast type content for subsequent transmission to one or more devices in, for example, a respective subscriber domain. Thus, the subscriber domain can include a network on which to convey the unicast type data to one or more target devices.

Thus, embodiments herein can include: prior to interleaving an adaptive bit rate data stream and a non-adaptive bit rate data stream on to the multi-stream data channel, a server resource can be configured to initially transmit portions of the non-adaptive bit rate data stream in the multi-stream data channel to the group of multiple subscribers in the cable network environment. In response to receiving a request from one of the multiple subscribers to view particular content in accordance with an adaptive bit rate, the server resource can be configured to interleave the non-adaptive bit rate data stream with the adaptive bit rate data stream in the multi-stream data channel.

As further described herein, the multi-stream data channel can include: multiple data streams of only adaptive bit rate content, a combination of adaptive bit rate data streams and non-adaptive bit rate data streams, etc.

In accordance with further embodiments, the server resource can be configured to produce the multi-stream data channel as discussed herein as a QAM (Quadrature Amplitude Modulated) signal. The QAM signal can be of fixed or predetermined bandwidth to distribute a limited number of data streams. In one instance, the QAM signal includes the portions of the adaptive bit rate data stream and the portions of the non-adaptive bit rate data stream. The server resource transmits the QAM signal over a backbone of a network for subsequent broadcast of the data streams in the QAM signal to the group of multiple subscribers in the cable network environment. The group can include multiple different subscribers, each of which has simultaneous and/or shared access to the adaptive bit rate data stream and the non-adaptive bit rate data stream in the QAM signal.

In accordance with further embodiments, the non-adaptive bit rate data stream represents a single data stream of encoded content. The level of quality of each of the segments of the non-adaptive bit rate data stream are known in advance of producing and transmitting the multi-stream data channel regardless of availability of bandwidth on the multi-stream data channel. The server resource produces the adaptive bit rate data stream in the multi-stream data channel to include segments of content encoded at different levels of quality depending on an availability of bandwidth on the multi-stream data channel.

Although a bit rate of the non-adaptive bit rate data stream over its entire length may be pre-known, the amount of bandwidth needed to convey the non-adaptive bit rate data stream can vary over time. In other words, the non-adaptive bit rate data stream may be encoded in accordance with a variable bit rate. One embodiment herein includes adjusting a level of quality of encoded segments of data included in the adaptive bit rate data stream in response to detecting a change in an amount of bandwidth needed to convey the non-adaptive bit rate data stream on the multi-stream data channel.

For example, if the available bandwidth in the multi-stream data channel increases because the non-adaptive bit rate data stream requires less bandwidth, the server resource increases a bit rate or level of quality of the adaptive bit rate data stream included in the multi-stream data channel. Conversely, if the available bandwidth in the multi-stream data channel decreases because the non-adaptive bit rate data stream requires more bandwidth, the server resource decreases a bit rate or level of quality of the adaptive bit rate data stream included in the multi-stream data channel.

In accordance with further embodiments, the adaptive bit rate data stream can be encoded to play back particular content at multiple different levels of quality over time depending on a parameter such as a level of congestion in the cable network environment; the non-adaptive bit rate data stream can be encoded for subsequent play back of a rendition of the particular content at one or more predetermined levels of quality regardless of a presence of the congestion in the cable network environment. As mentioned above, the server resource can be configured to populate the multi-stream data channel with the adaptive bit rate data stream in response to a trigger event such as a subscriber in a cable network environment requesting to view content in an adaptive bit rate format. In certain cases, in response to another trigger condition, the server resource can be configured to discontinue including and/or transmitting a data stream in the multi-stream data channel. This can result in freeing up of available bandwidth in the multi-stream data channel. In response to terminating inclusion of a given data stream in the multi-stream data channel resulting in freeing of bandwidth in the multi-stream data channel, embodiments herein can include increasing a level of quality (or bit rate) of the portions of content included in the adaptive bit rate data stream in the multi-stream data channel. In other words, the freed up bandwidth (from dropping of a data stream) can be used to increase a level of quality (or bit rate) of segments of content included in the adaptive bit rate data stream.

As previously discussed, note further that the level(s) of quality of the non-adaptive bit rate data stream and how it varies over time, if at all, is pre-known and does not change if more bandwidth is available. That is, the non-adaptive bit rate data stream is not adaptive. Thus, coding of the non-adaptive bit rate data stream is static and pre-known for each segment (although the bit rate can vary from segment to segment); coding of the adaptive bit rate data stream is dynamic and varies.

In accordance with further embodiments, the adaptive bit rate data stream can be a unicast-type data stream. In such an instance, the server resource multicasts the adaptive bit rate data stream as a unicast-type data stream in the multi-stream data channel over the network to multiple subscribers in the cable network environment. In other words, a subscriber can request the unicast-type data stream for playback on a respective device coupled to a shared communication link. Once received, the other subscribers on the shared channel that subscribe to the stream can retrieve and playback the unicast-type data stream transmitted on the shared channel.

In accordance with yet further embodiments, a server resource initiates distribution of data stream information (e.g., content access information) indicating addresses in which to retrieve the portions of the adaptive bit rate data stream. A client communication device (e.g., a subscriber controlled device) coupled to the shared communication link and operated by a subscriber receives the data stream information. By way of a non-limiting example, the addresses can specify different locations from which to retrieve segments of video encoded according to different levels of playback quality. The client device notifies the server resource which level of quality of the adaptive bit rate data stream to include in the multi-stream data channel. The server resource retrieves the portions of the adaptive bit rate data stream to include the multi-stream data channel in response to receipt of a request from a subscriber in the group.

In one embodiment, the adaptive bit rate represents a program or content that is available during a scheduled time frame. In other words, the multi-stream data channel can be used in linear television programming applications. In accordance with such an embodiment, the adaptive bit rate data stream in the multi-stream data channel is made available to the multiple subscribers during a pre-scheduled time slot during which the multiple subscribers can select playback of such content. Upon selection of viewing the content, the server resource interleaves the portions of the adaptive bit rate data stream with the non-adaptive bit rate data stream into the multi-stream data channel in accordance with linear television programming. In a switched digital video application, subsequent to a single subscriber requesting the content for viewing via retrieval of an adaptive bit rate data stream, the server resource interleaves the adaptive bit rate data stream in the multi-stream data channel in response to receiving a request from a subscriber in the group to view particular content. In a shared access application, the adaptive bit rate data stream is available for retrieval by each of the subscribers in a service group.

In alternative embodiments, the adaptive bit rate data stream can represent on-demand content that is distributed to subscribers in response to a subscriber requesting the content for viewing. In such an instance, the server resource includes the adaptive bit rate data stream to in the multi-stream data channel occurs in response to receiving a request to view on-demand content.

In accordance with further embodiments, a gateway resource in a subscriber domain of a cable network environment receiving a multi-stream data channel. The multi-stream data channel includes first multicast content and second multicast content. The gateway resource translates the first multicast content in the multi-stream data channel into one or more (redundant) unicast stream(s). The gateway resource transmits each unicast stream to a device in the subscriber domain.

In yet another embodiment, a processing resource receives portions of a first data stream, the first data stream being an adaptive bit rate data stream. The processing resource receives portions of a second data stream. The processing resource interleaves the portions of the first data stream and the portions of the second data stream onto a multi-stream data channel. A server resource initiates transmission of the multi-stream data channel over a network to a service group of multiple subscribers in a cable network environment. The processing resource varies an amount of bandwidth in the multi-stream data channel that is allocated to convey the first data stream depending on an amount of unused bandwidth that is available in the multi-stream data channel.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium having instructions stored thereon to facilitate distribution of content in a multi-stream data channel. The instructions, when executed by a processor of a respective computer device, cause the processor or multiple processors to: receive portions of an adaptive bit rate data stream; receive portions of a non-adaptive bit rate data stream; interleave the portions of the adaptive bit rate data stream and the portions of the non-adaptive bit rate data stream onto a multi-stream data channel; and initiate transmission of the multi-stream data channel over a network to a group of multiple subscribers in a cable network environment.

In accordance with another embodiment, the instructions, when executed by a processor of a respective computer device, cause the processor or multiple processors to: interleave portions of an adaptive bit rate data stream and a non-adaptive bit rate data stream into a multi-stream data channel; broadcast the multi-stream data channel over a communication link, each of multiple subscribers having access to the adaptive bit rate data stream and the non-adaptive bit rate data stream in the multi-stream data channel; and in response to detecting a change in bandwidth needed to transmit the non-adaptive bit rate data stream, modify an amount of bandwidth in the multi-stream data channel that is allocated for transmission of the adaptive bit rate data stream.

In accordance with still another embodiment, the instructions, when executed by a processor of a respective computer device, cause the processor or multiple processors to: monitor each of multiple multi-stream data channels for available bandwidth; identify that a particular multi-stream data channel of the multiple multi-stream data channels includes an adaptive bit rate data stream, the particular multi-stream data channel broadcasted to a service group including multiple subscribers; adjust a level of playback quality of the adaptive bit rate data stream in the particular multi-stream data channel to free bandwidth in the particular multi-stream data channel; and utilize the freed bandwidth to transmit an additional data stream in the particular multi-stream data channel.

In accordance with still another embodiment, the instructions, when executed by a processor of a respective computer device, cause the processor or multiple processors to: receive a multi-stream data channel from an upstream switched digital video server, the multi-stream data channel including interleaved portions of an adaptive bit rate data stream and a non-adaptive bit rate data stream; retrieve the portions of the adaptive bit rate data stream from the multi-stream data channel; and broadcast the portions of the adaptive bit rate multi-stream data channel over a communication link to a group of multiple subscribers in a cable network environment.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of distributing different levels of quality of content in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 9 is an example diagram illustrating content access information according to embodiments herein.

DETAILED DESCRIPTION

By way of a non-limiting example, in one embodiment, a server resource receives portions of a non-adaptive bit rate data stream. The server resource also receives portions of an adaptive bit rate data stream. Portions of the data streams included on the multi-stream data channel can be of substantially the same size or different size. The server resource or an assembler can be configured to produce a multi-stream data channel of fixed available bandwidth. In other words, in one embodiment, by way of a non-limiting example, the multi-stream data channel can be of fixed available bandwidth capacity such that only a predefined number of bits may be encoded on the multi-stream data channel. In one embodiment, the multi-stream data channel is a QAM channel.

The server resource interleaves the portions of the adaptive bit rate data stream and the portions of the non-adaptive bit rate data stream onto the multi-stream data channel. The multi-stream data channel can include any suitable number of data streams depending on available bandwidth.

Via the generated multi-stream data channel, the server resource transmits the non-adaptive bit rate data stream and the adaptive bit rate data stream over a network such as a backbone or core network to a remote destination such as an distribution resource. The distribution resource such as a node in a cable network, in turn, transmits the multi-stream data channel including the adaptive bit rate data stream and the non-adaptive bit rate data stream to a group of multiple subscribers that have shared access to communication link in a cable network environment.

Subscribers in the cable network environment can subscribe to receiving the content transmitted in the multi-stream data channel. For example, each recipient in the cable network environment can include one or more processing resources that receive the multi-stream data channel and translate the multicasted content (e.g., adaptive bit rate unicast type transmitted content or non-adaptive bit rate unicast type transmitted content) received on the multi-stream data channel into unicast type content for playback by one or more devices in, for example, a respective subscriber domain.

Figure 1:
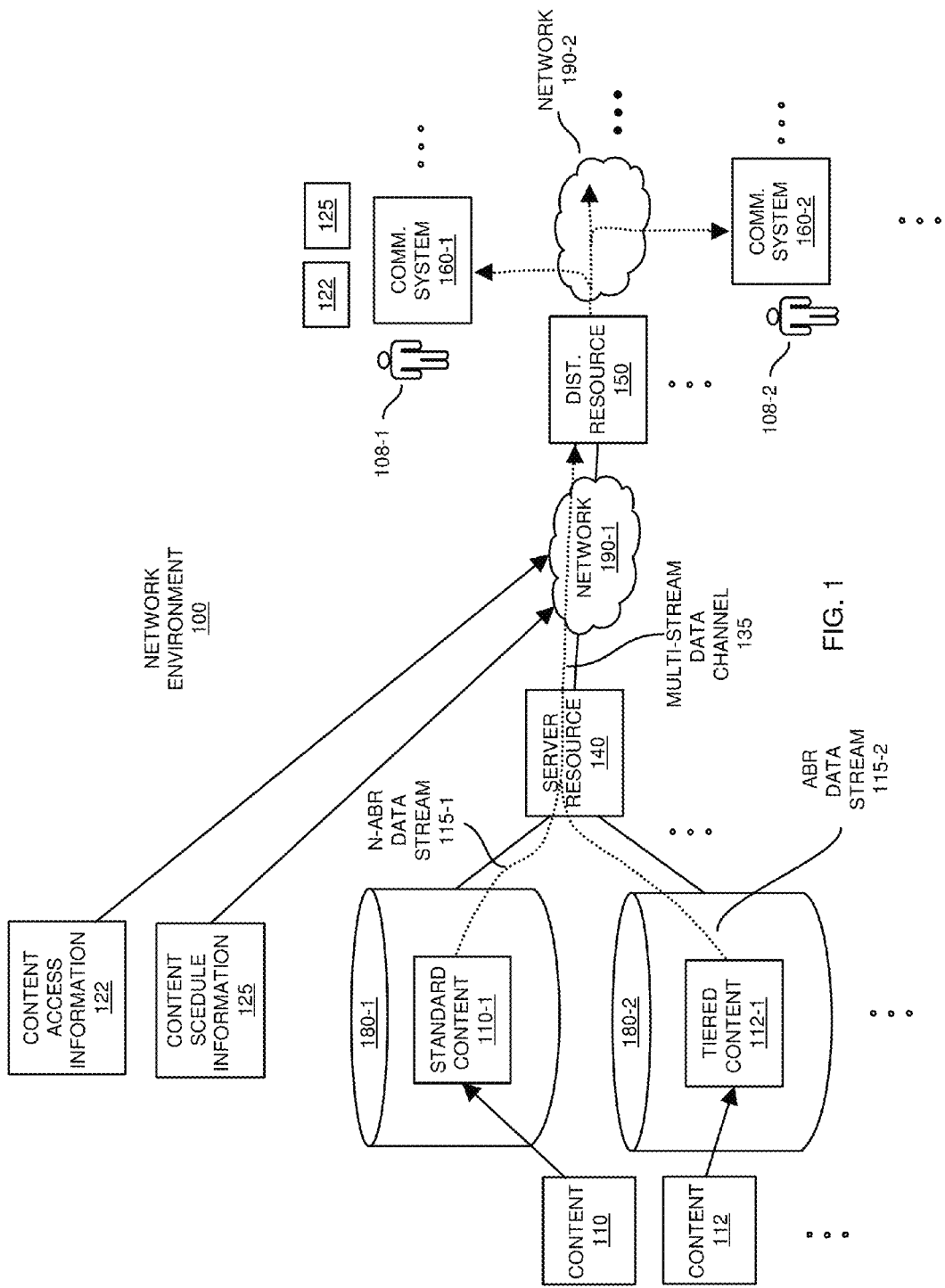
FIG. 1 is an example diagram illustrating a network environment and transmission of a multi-stream data channel according to embodiments herein.

More specifically, FIG. 1 is an example diagram of a network environment facilitating novel distribution of a multi-stream data channel including at least one adaptive bit rate data stream and at least one non-adaptive bit rate data stream according to embodiments herein.

As shown, network environment 100 includes content 110, content 112, repository 180-1, repository 180-2, server resource 140 (e.g., one or more servers), network 190-1 (e.g., a core network, backbone, etc.), network 190-1 (e.g., a cable network, shared network, etc.), and communication systems 160 operated by respective users 108 (e.g., subscribers).

In general, communication systems 160 communicate (e.g., transmit and/or receive data) over one or more networks 190 with server resource 140. By way of a non-limiting example, each of the communication systems 160 can be or include any suitable type of mobile or non-mobile device such as a cellular phone device, mobile device, personal digital assistant, touch pad device, portable computer, wire-line telephone, cable set-top box, television, display screen, wireless phone, wireless mobile device, television, etc.

Networks 190 can be and/or include any suitable type of network supporting communications amongst communication systems 160 and or other resources in network environment 100. For example, networks 190 can be and/or include a phone network, cellular phone network, Internet, local area network, public switched telephone network, cable network, hybrid-fiber coaxial network, etc.

By way of a non-limiting example, the network 190-2 can be a shared common medium (e.g., coaxial cable, fiber, optical medium, etc.) in which each of the subscribers 108 receives the data transmitted by distribution resource 150. Depending on the embodiment, the distribution resource 150 can be configured to re-transmit the multi-stream data channel 135 to each of the subscribers over network 190-2. In one embodiment, the multiple subscribers are members in a particular service group.

In accordance with such an embodiment, each recipient in the cable network environment can include one or more so-called gateway resources that translate the received multicast content (e.g., adaptive bit rate content or non-adaptive bit rate content) transmitted in the multi-stream data channel 135 into unicast type content. A respective gateway resource in a subscriber domain then transmits the unicast content (e.g., in accordance with an Ethernet protocol) to one or more play back devices in, for example, a respective subscriber domain.

In one embodiment, unicast is, by definition, one gateway to one device. However, the gateway resource according to embodiments herein can create one or more copies of a received unicast stream (e.g., unicast content) and send a copy of the content to each of multiple devices.

In alternative embodiments, the distribution resource 150 can be configured to de-multiplex the data streams in the multi-stream data channel 135 and transmit such data streams to each of the subscribers 108 in respective one or more channels.

Note that embodiments herein can include any number of distribution type resources in communication with server resource 140 over network 190-1. Each distribution resource can distribute data streams to a different service group of multiple subscribers that share access to a common network.

Communication systems 160 can be and/or include any suitable type of processing devices such as a personal computer, television, Apple™ products, set-top boxes, servers, cable modems, etc., including one or more respective media players configured to playback media to a user.

Content 110 and content 112 can be any suitable data such as video information, audio information, etc., that is played back at one or more different levels of quality.

In this example embodiment, the repositories 180 (e.g., repository 180-1 and repository 180-2) store same or different content in different formats. For example, repository 180-1 stores content 110 as standard content 110-1 (e.g., a standard content format) in which the content 110 is formatted as a non-adaptive bit rate format. The server resource 140 retrieves and/or produces the non-adaptive bit rate data stream 115-1 based on the standard content 110-1 stored in repository 180-1.

Repository 180-2 stores content 112 as tiered content 112-2 in which each of the segments of the content 112 are available according to multiple different levels of quality. The server resource 140 produces and/or receives encoded content from tiered content 112-1 to produce a data stream of content encoded in an adaptive bit rate format.

In one embodiment, content 110 and content 112 represent the same movie, program, video, audio, etc. In alternative embodiments, the content 110 can represent a first movie, program, video, audio, etc.; the content 112 represents a second movie, program, video, audio, etc.

In general, in accordance with one embodiment, the server resource 140 produces and/or transmits one or more multi-stream data channels to distribute content as one or more stream of data to subscribers 108. Each multi-stream data channel 135 can be configured to include and convey multiple data streams to a destination such as distribution resource 150, communication systems 160, etc.

In one embodiment, the multi-stream data channel 135 as discussed herein is a channel having a predetermined amount of available bandwidth on which to transmit data. In one embodiment, by way of a non-limiting example, the multi-stream data channel is a QAM-encoded signal having a known bandwidth on which to convey data.

In this example, the server resource 140 combines at least the non-adaptive bit rate data stream 115-1 and the adaptive bit rate data stream 115-2 onto multi-stream data channel 135. As mentioned, the server resource 140 initiates transmission of the non-adaptive bit rate data stream 115-1 and the non-adaptive bit rate data stream 115-2 in the multi-stream data channel 135 over network 190-1 to subscribers 108 in network 190-2. The subscribers 108 utilize their respective communication systems 160 to retrieve and playback the transmitted content.

As mentioned, each of communication systems 160 can include one or more processing devices supporting gateway processing. So-called gateway processing in a subscriber domain (or potentially elsewhere in network environment 100) can include: receiving the multicast content in the multi-stream data channel 135, converting the multicast content into one or more unicast data streams, and then distributing the unicast content to one or more devices.

Figure 2:
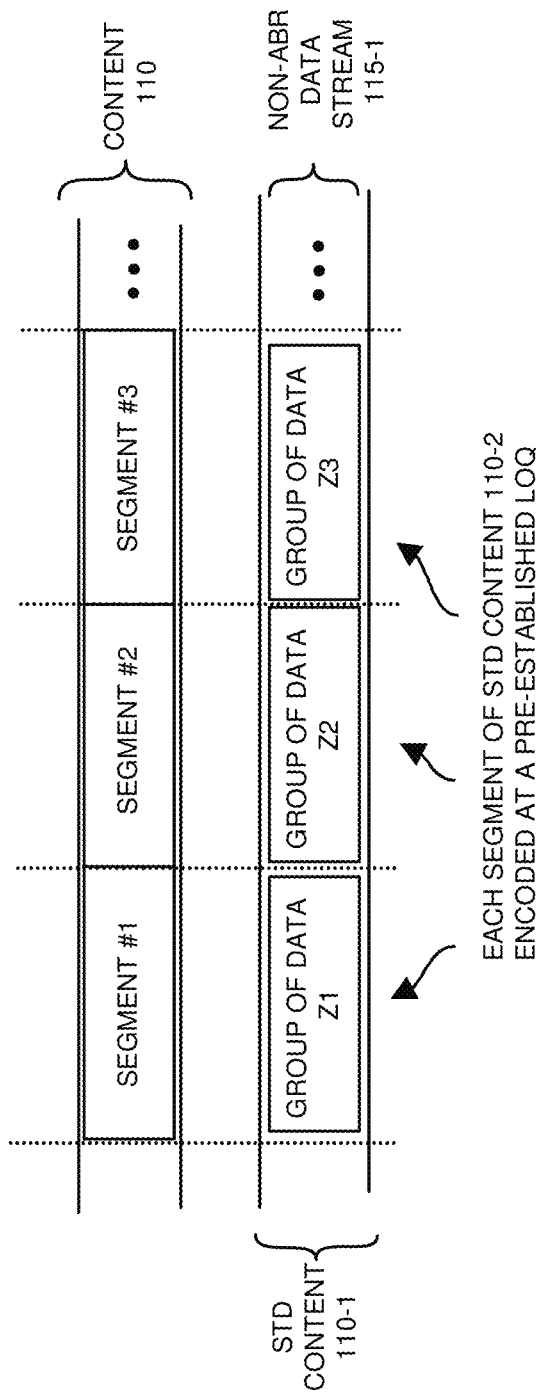
FIG. 2 is an example diagram illustrating a non-adaptive bit rate data stream according to embodiments herein.

FIG. 2 is an example diagram illustrating further details of standard content 110-1 stored in repository 180-1 according to embodiments herein.

As shown, a processing resource initially parses content 110 into segments 1, 2, 3, and so on. In one embodiment, each of the segments of content 110 represents encoded information that is used to playback a portion of the content 110. By way of a non-limiting example, each segment of content 110 can represent any suitable amount of data or data packets such as up to or more than several seconds of video to be played back on a respective media player.

In this example, the standard content 110-1 (as derived from content 110) represents a non-adaptive bit rate data stream 115-1 for transmission on the multi-stream data channel 135.

By further way of a non-limiting example, the standard content 110-1 is identified as being non-adaptive because each portion or segment of the content 110 is encoded at a pre-known level of quality or bit rate. In other words, there is no alternative bit rate or level of quality for each segment of content 110. In this example, grouping of data Z1 represents segment #1 of content 110 encoded at a first pre-established level of quality or bit rate; grouping of data Z2 represents segment #2 of content 110 encoded at a second pre-established level of quality or bit rate; grouping of data Z3 represents segment #3 of content 110 encoded at a third pre-established level of quality or bit rate; and so on.

When interleaving the portions of the non-adaptive bit rate data stream 115-1 amongst other data streams into the multi-stream data channel 135, the server resource 140 does not select amongst multiple different encoding options for a given segment. Instead, the server resource 140 includes the only available encoded content for the respective segment in the multi-stream data channel 135. Thus, an amount of bandwidth of the multi-stream data channel 135 needed to accommodate the non-adaptive bit rate data stream 115-1 is determinate or pre-known.

Note that, although a bit rate of the non-adaptive bit rate data stream 115-1 over its length may be pre-known for each respective segment or portion, the amount of bandwidth needed to convey each of the segments of the non-adaptive bit rate data stream can vary over time. In other words, the non-adaptive bit rate data stream 115-1 may be encoded in accordance with a variable bit rate in which grouping of data Z1 requires more bandwidth to transmit than grouping of data Z2; the non-adaptive bit rate data stream may be encoded in accordance with a variable bit rate in which grouping of data Z2 may require less bandwidth to transmit than grouping of data Z3, and so on.

Alternatively, note that each of the segments of content 110 in the non-adaptive bit rate data stream 115-1 may be encoded in accordance with a constant bit rate or substantially same bit rate or level of quality. In other words, when the content 110 is encoded at a constant bit rate to produce non-adaptive bit rate data stream 115-1, the bit rate and/or level of playback quality associated with each of the encoded segments in the non-adaptive bit rate data stream 115-1 is substantially the same.

As will be discussed later in this specification, regardless of whether the non-adaptive bit rate data stream 115-1 is encoded as a constant bit rate data stream or a variable bit rate data stream for each segment, one embodiment herein includes adjusting a level of quality or bit rate of encoded segments of an adaptive bit rate data stream 115-2 that is included in the multi-stream data channel 135 in response to detecting a change in an amount of bandwidth needed to convey the non-adaptive bit rate data stream 115-1 on the multi-stream data channel 135. In other words, if portions of the non-adaptive bit rate 115-1 data stream (e.g., a first data stream) consumes less bandwidth on the multi-stream data channel 135 at a particular instant in time, then this available bandwidth can be used to increase a level of quality or bit rate of one or more segments of content 112 included in the adaptive bit rate data stream (e.g., a second data stream). Conversely, if portions of the non-adaptive bit rate 115-1 data stream consumes more bandwidth on the multi-stream data channel 135 at a particular instant in time, then the extra bandwidth needed for the respective segment of the non-adaptive bit rate data stream 115-1 can be obtained by decreasing a level of quality or bit rate of one or more segments of content 112 included in the adaptive bit rate data stream 115-2.

In one embodiment, the non-adaptive bit rate data stream is encoded to enable playback a rendition of particular content at predetermined levels of quality regardless of available bandwidth on the multi-stream data channel, a presence of congestion, etc., in a cable network environment.

Figure 3:
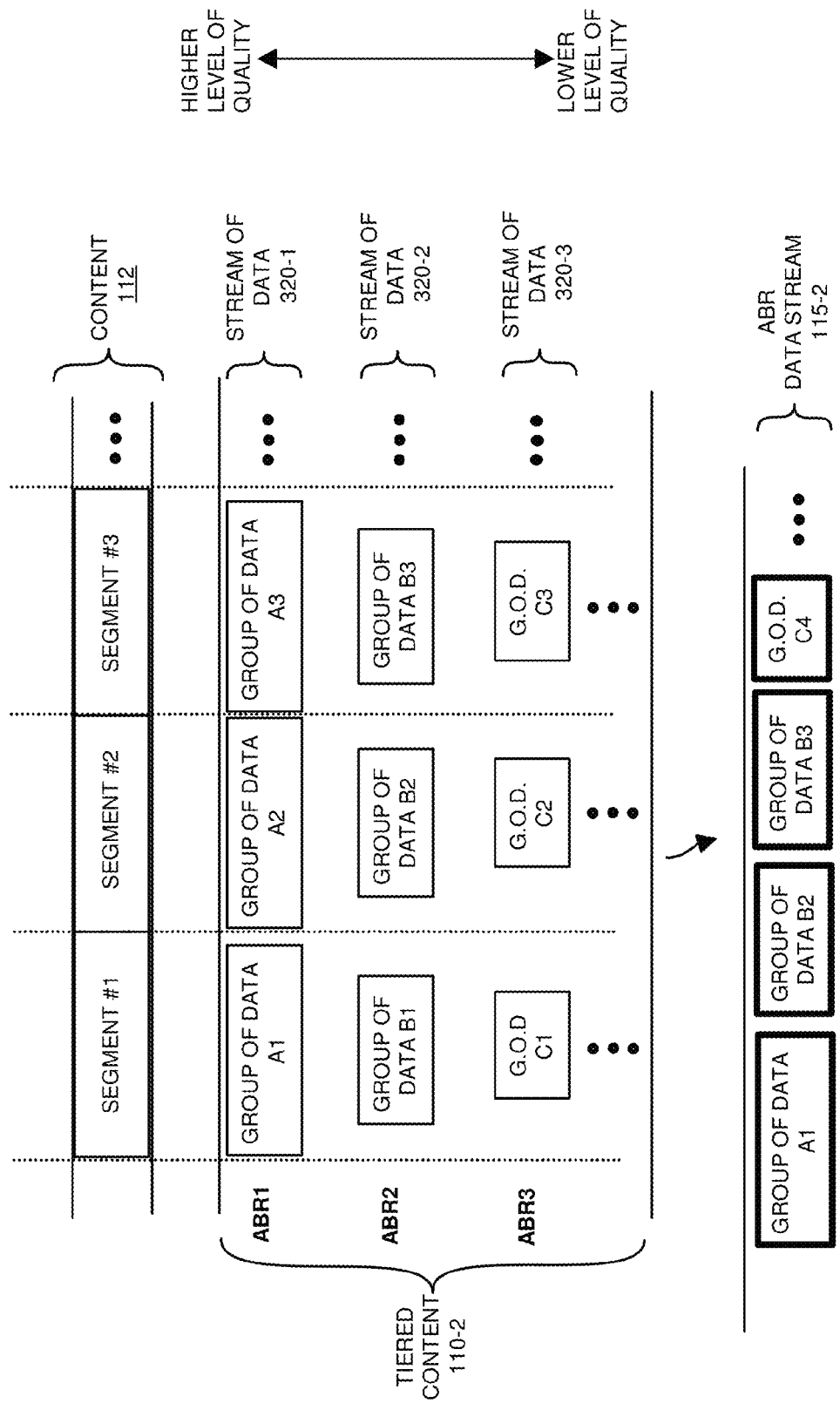
FIG. 3 is an example diagram illustrating tiered content encoded at different levels of quality and generation of an adaptive bit rate data stream according to embodiments herein.

FIG. 3 is an example diagram illustrating tiered content from which to generate an adaptive bit rate data stream according to embodiments herein.

Note again that content 112 can represent a same or different movie, program, etc., than content 110.

As shown, tiered content 110-2 (as derived from content 112) includes segments of content encoded at different levels of quality. For example, in one embodiment, a processing resource parses the content 110 into segments 1, 2, 3, etc. The processing resource encodes each of the segments of content 110 at multiple levels of quality or bit rates to produce multiple streams of data 320.

As previously discussed, the content 112 can be any suitable data such as a video stream, audio stream, slide show, etc., that is played back by an end user 108 over time as the data is received. In one embodiment, a respective media player operated by a subscriber 108 plays back the adaptive bit rate data stream 115-2 (as derived form the tiered content 112-1) encoded at different levels of quality.

As shown, and as mentioned, each of the multiple streams of data 320 can be encoded to enable play back of the content 112 according to a different level of quality. For example, the server resource 140 or other suitable resource converts segment #1 of the original content 112 (e.g., a portion such as up to or more than several seconds of a video) into grouping of data A1, grouping of data B1, grouping of data C1, etc. Each grouping of data can include one or more data packets.

Grouping of data A1 supports playback of segment #1 of content 112 according to a first level of quality; grouping of data B1 supports playback of segment #1 of content 112 according to a second level of quality; grouping of data C1 supports playback of segment #1 of content 112 according to a third level of quality; and so on. The amount of bits needed to encode a respective segment of the content 112 is greater at the higher levels of quality than at the lower levels of quality.

Further, a processing resource converts segment #2 (e.g., a next segment following segment #1) of the content 112 (e.g., a portion such as several seconds of a video) into grouping of data A2, grouping of data B2, grouping of data C2, etc. Grouping of data A2 supports playback of segment #2 of content 112 according to the first level of quality; grouping of data B2 supports playback of segment #2 of content 112 according to the second level of quality; grouping of data C2 supports playback of segment #2 of content 112 according to the third level of quality; and so on.

Thus, in this way, each segment of the content 112 is broken down into groupings of data at the different levels of quality. Each stream of data 320 supports playback of content according to a different level of quality as shown. For example, stream of data 320-1 supports playback of content 112 according to a first level of quality; stream of data 320-2 supports playback of content 112 according to a second level of quality; stream of data 320-3 supports playback o further comprising 112 according to a third level of quality; and so on.

In accordance with one embodiment, each of the groupings of data indicates how to: control settings of multiple display elements (e.g., pixels, picture elements, etc.) of a display screen, generate an audio signal, etc.

Each of the segments in a respective stream of data 320 can support playback of content 112 at a different level of quality or resolution. In this non-limiting example, assume that the stream of data 120-1 (e.g., highest level of quality) supports playback of content such as a movie at a resolution of 1920×1080 pixels; the stream of data 120-3 (e.g., a next lower level of quality) supports playback of the movie at a resolution of 1280×720 pixels; and so on. Thus, lower levels of quality can support playback of lower resolution renditions of the content 112.

In one embodiment, as mentioned, each of the groupings of data derived from segments of content 112 can include one or more data packets in accordance with any suitable format such as MPEG (Moving Picture Expert Group) format. That is, the content 112 can be packetized into multiple streams of data 320 to facilitate distribution in an adaptive bit rate data stream 115-2.

Further, note that each of the data streams included in the multi-stream data channel can include appropriate metadata to facilitate orderly playback of respective content.

In this example, based on available bandwidth in the multi-stream data channel 135, assume that the server resource 140 selects the sequence of encoded content including grouping of data A1, grouping of data B2, grouping of data B3, grouping of data C4, etc., as the adaptive bit rate data stream 115-2. The inclusion of the segments of content 112 at the different levels of quality indicates how to construct an adaptive bit rate data stream form tiered content 112-1 (e.g., multiple streams of data 320).

Figure 4:
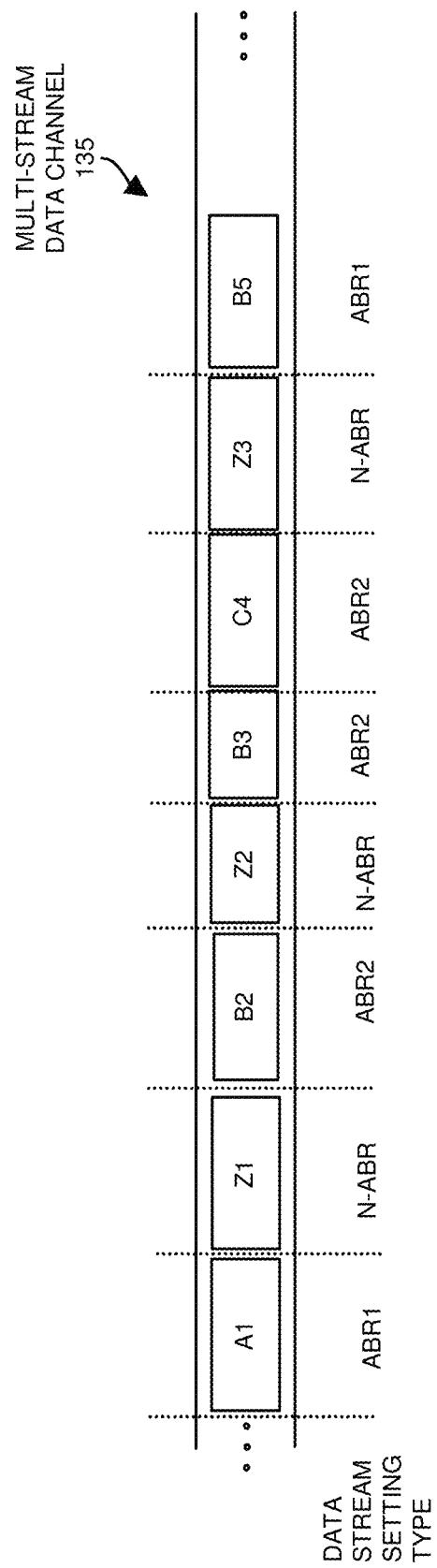
FIG. 4 is an example diagram illustrating interleaving of at least one adaptive bit rate data stream and a non-adaptive bit rate data stream in a multi-stream data channel according to embodiments herein.

FIG. 4 is an example diagram illustrating interleaving of at least one non-adaptive bit rate data stream and an adaptive bit rate data stream according to embodiments herein.

As previously mentioned, in contrast to conventional methods, embodiments herein include unique ways to provide more efficient use of available bandwidth in a multi-stream data channel 135. In one embodiment, the multi-stream data channel is a MPTS (Multi-Program Transport Stream) used to convey streams of data in a network environment.

As discussed above, one embodiment herein includes combining at least one non-adaptive bit rate data stream 115-1 and at least one adaptive bit rate data stream 115-2 on the multi-stream data channel 135 to ensure better efficiency of delivering the same or different content in a network environment 100.

As mentioned, further embodiments can include transmitting only adaptive bit rate encoded content in the multi-stream data channel. In such an instance, the server resource 140 interleaves segments of the multiple adaptive bit rate data streams to produce the multi-stream data channel 135.

Also, as mentioned, the level of quality of segments included in the adaptive bit rate data stream 115-2 can vary over time depending on a parameter such as the availability of excess bandwidth on the multi-stream data channel 135. As discussed below, other parameters below can be used to determine which level of quality of particular content to include in the adaptive bit rate data stream 115-2.

In this example, the server resource interleaves the portions of the adaptive bit rate data stream 115-1 (e.g., grouping of data A1, grouping of data B2, grouping of data B3, grouping of data, C4, . . . ) and the portions of the non-adaptive bit rate data stream 115-2 (e.g., Z1, Z2, Z3, . . . ) onto the multi-stream data channel 135. The rate of transmitting the bits in the multi-stream data channel 135 can be substantially greater than the playback rate of the respective content such that the segments of encoded content on the multi-stream data channel 135 for a given data stream are consumed by a media player at approximately a same rate at which the segments are transmitted on the multi-stream data channel 135.

Referring again to FIG. 1, the server resource 140 initiates transmission of the multi-stream data channel 135 at a suitable rate over a network 190-1 such as a backbone or core network to a downstream resource such as distribution resource 150. When gateway processing is performed in the distribution resource 150, the distribution resource 150, in turn, demultiplexes the multi-stream data channel into unicast streams and initiates transmission of the adaptive bit rate data stream 115-2 and the non-adaptive bit rate data stream 115-2 to a particular destination and/or a group of multiple subscribers that have shared access to communication link in a cable network environment. In other words, the subscriber 108-1, subscriber 108-02, etc., may be part of a same service group in which each of the subscribers 108 receives the information transmitted by the distribution resource 150 over network 190-2.

In accordance with another embodiment, in which the gateway processing resides closer to users such as in respective communication systems 160 of subscriber domains (such as a home network environment including a set-top box, modem, etc.), the distribution resource 150 forwards the multi-stream data channel 135 to each of multiple subscribers. In such an instance, each of the communication systems 160 can be configured with appropriate gateway processing resources to process the received multi-stream data channel and retrieve the data streams encoded therein for playback of encoded content.

In accordance with a more specific embodiment, each communication device 160 can be configured to include a so-called gateway processing resource that translates the received multicast content (e.g., adaptive bit rate content or non-adaptive bit rate content) in the multi-stream data channel 135 into unicast type content. The gateway processing resource in the communication system 160 transmits the unicast content (e.g., in accordance with an Ethernet protocol) to one or more playback devices in the subscriber domain.

Figure 5:
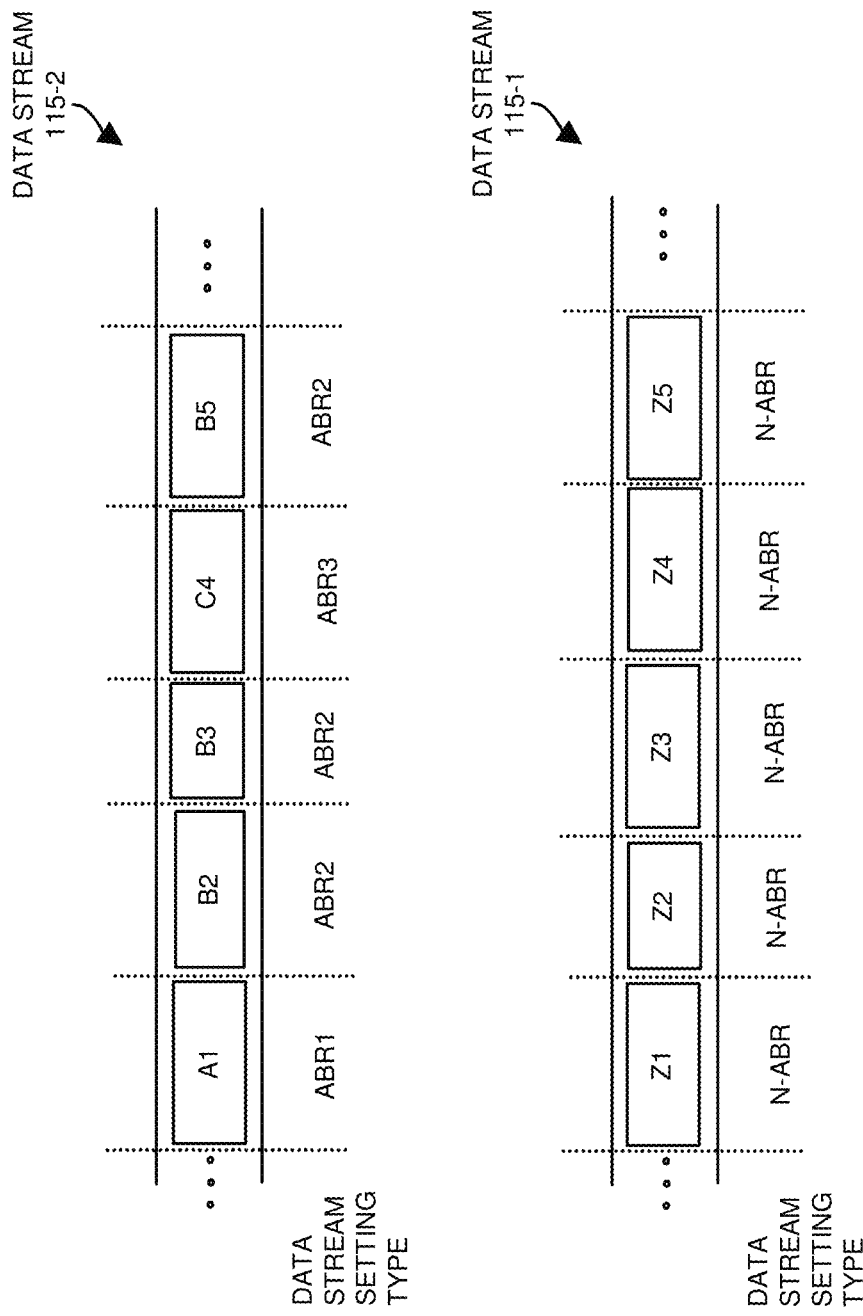
FIG. 5 is an example diagram illustrating de-multiplexing of a multi-stream data channel into at least an adaptive bit rate data stream and a non-adaptive bit rate data stream according to embodiments herein.

Alternatively, as previously mentioned, the edge resource 150 can be configured to de-multiplex the multi-stream data channel 135 into multiple data streams 115-1 and 115-2 as shown in FIG. 5 and forward the respective data streams on independent, tunable channels over the shared network. The subscribers 108 operating the communication systems 160 can tune to a respective available channel to retrieve and playback a respective data stream (e.g., the adaptive bit rate data stream 115-2, non-adaptive bit rate data stream 115-1, etc.).

Note again that data stream 115-1 is shown as being a non-adaptive bit rate type only as an illustrative embodiment. In accordance with other embodiments, each of the data stream 115-1 can be an adaptive bit rate data stream that is interleaved with adaptive bit rate data stream 115-2 to produce the multi-stream data channel 135. Thus, a particular multi-stream data channel can include adaptive bit rate transmitted content.

Assume in this example that the multi-stream data channel 135 includes both adaptive bit rate data and non-adaptive bit rate data. In accordance with further embodiments, the multi-stream data channel 135 can be conveyed in accordance with switched digital video content available to each of the subscribers 108 in a respective service group of network environment 100. In such an instance, the server resource 140 and/or distribution resource 150 initiates distribution of the adaptive bit rate data stream 115-2 and the non-adaptive bit rate data stream 115-2 in the multi-stream data channel 135 as switched video content to each communication system 160 in a service group in response to at least one of the subscribers in the group requesting to retrieve the adaptive bit rate data stream 115-2. In other words, initially, neither the adaptive bit rate data stream 115-2 nor the non-adaptive bit rate data stream 115-1 may be transmitted over the network 190-2 to subscribers 108 because no subscriber has requested to view such content. Assume that subscriber 108-1 requests the viewing of content 112 at an adaptive bit rate. In response to the request, assuming the multi-stream data channel 135 has an appropriate amount of bandwidth available, the server resource 140 can include the adaptive bit rate data stream 115-2 in the multi-stream data channel 135.

Assume further that another subscriber 108-2 requests the viewing of content 112 at a non-adaptive bit rate (e.g., standard format). In response to the request, assuming the multi-stream data channel 135 has an appropriate amount of bandwidth available, the server resource 140 can include the non-adaptive bit rate data stream 115-1 in the multi-stream data channel 135. The distribution resource 150 forwards the multi-stream data channel 135 including the adaptive bit rate data stream 115-2 and the non-adaptive bit rate data stream 115-1 to the members of the service group.

In one embodiment, the adaptive bit rate data stream 115-2 is transmitted as an MPEG 4 adaptive bit rate; the non-adaptive bit rate data stream 115-1 is transmitted as an MPEG 2 transport stream. The gateway processing disposed in either the distribution resource 150 or the communication system 160 can be a QAM (Quadrature Amplitude Modulation) termination device that initiates termination of switched digital video sessions.

Once available in network 190-2 because the content 112 (e.g., adaptive bit rate data stream 115-2) is transmitted based on the request from subscriber 108-1 operating communication system 160-1, any of the other subscribers in network 190-2 in the service group can tune to the appropriate channel and playback such content because the data stream is available on the shared communication medium.

Thus, embodiments herein can include: prior to interleaving an adaptive bit rate data stream 115-2 and a non-adaptive bit rate data stream 115-1 on to a multi-stream data channel 135, a server resource 140 can be configured to initially transmit portions of the non-adaptive bit rate data stream 115-1 in the multi-stream data channel 135 to the group of multiple subscribers 108 in the cable network environment. In response to receiving a request from one of the multiple subscribers 108 to view particular content 112 in accordance with a particular format such as an adaptive bit rate, higher level of quality, etc., the server resource 140 interleaves the non-adaptive bit rate data stream 115-1 with the adaptive bit rate data stream 115-2 in the multi-stream data channel 135.

The multi-stream data channel 135 can be encoded in accordance with any suitable format or protocol. In accordance with one embodiment, the server resource 140 produces the multi-stream data channel 135 as discussed herein as a QAM (Quadrature Amplitude Modulated) signal. The QAM signal or QAM channel can be terminated at any suitable resource in the network environment.

In this instance, the QAM signal includes at least the portions of the adaptive bit rate data stream 115-2 and the portions of the non-adaptive bit rate data stream 115-1. As mentioned, the multi-stream data channel 135 can be a high-speed data channel including any number of suitable data streams. The server resource 140 transmits the QAM signal over a high-speed backbone of a network 190-1 for subsequent broadcast of the data streams in the QAM signal to the group of multiple subscribers 108 in a service group of cable network environment.

Figure 6:
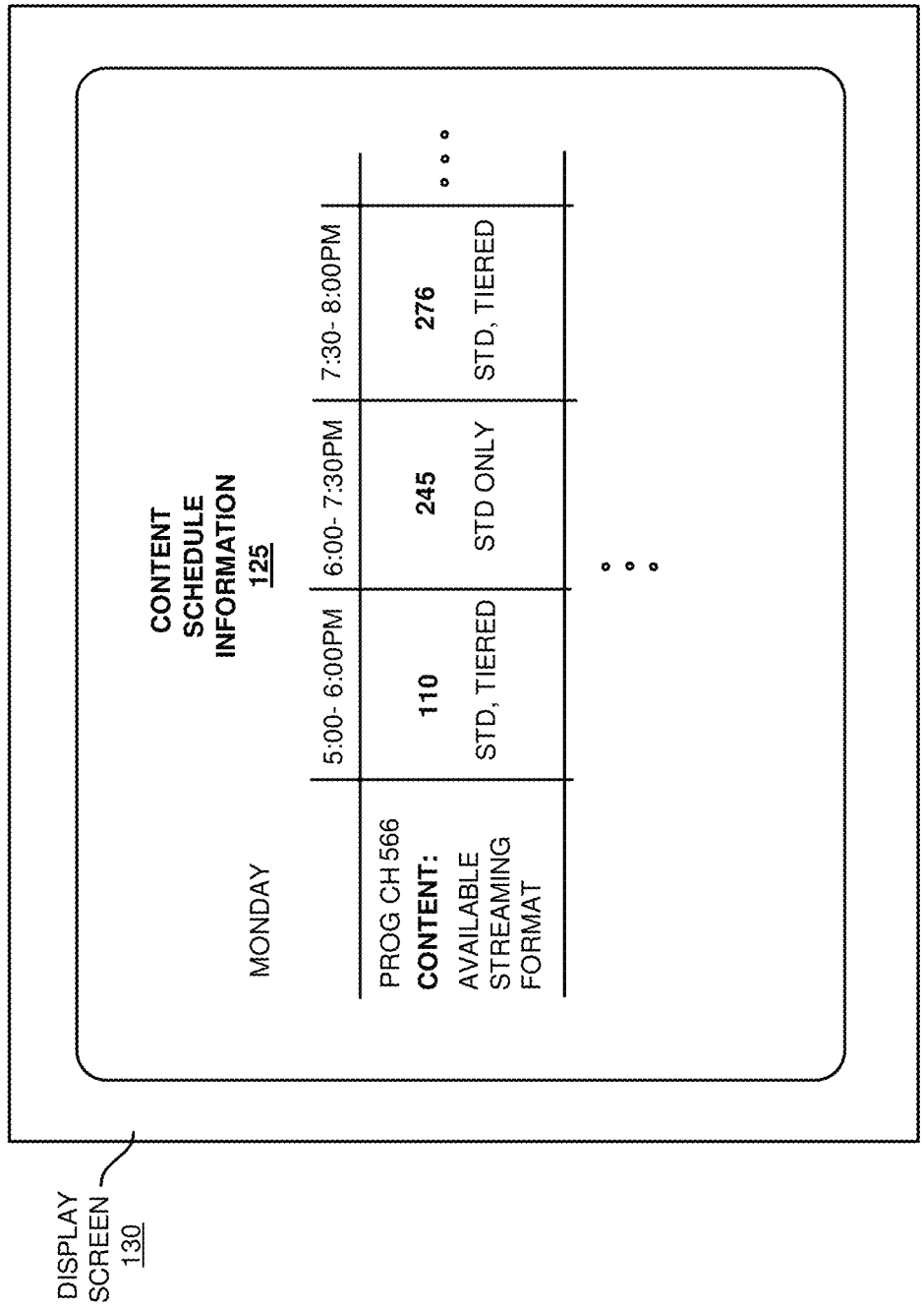
FIG. 6 is an example diagram illustrating content schedule information according to embodiments herein.

FIG. 6 is an example diagram illustrating content schedule information according to embodiments herein.

In one embodiment, the multi-stream data channel 135 supports linear television programming. Via transmission of content schedule information 125 over network 190-1 to the one or more subscribers 108, the subscribers 108 are apprised, via a notification (e.g., an advertisement, a program guide, etc.), when the different content (e.g., content 110, content 112, etc.) is available for retrieval at scheduled times.

In this non-limiting example, the content schedule information 125 retrieved and viewed by a respective subscriber 108 indicates that content 110 is available at a standard level of quality (e.g., a non-adaptive bit rate data stream) as well as is available at tiered levels of quality (e.g., an adaptive bit rate) at a scheduled time such as on Monday between 5:00-6:00 pm.

In one embodiment, the server resource 140 can be configured to transmit the content 110 in the standard format (e.g., as a non-adaptive bit rate data stream 115-1) to the subscribers in network 190-1 as non-switched digital video. In other words, the non-adaptive bit rate data stream 115-1 can be multicasted to subscribers regardless of whether any of the subscribers 108 requests and/or tunes to decode such content for viewing. In accordance with content schedule information 125, during the time slot between 5:00-6:00 pm, the subscribers 108 in network 190-2 can utilize their respective communication systems 160 to tune to an appropriate channel to retrieve the content 110 formatted as the available non-adaptive bit rate data stream 115-1.

A subscriber 108 may wish to view the content 110 encoded in accordance with an adaptive bit rate (and potentially higher level of quality) instead of the standard format (e.g., non-adaptive bit rate). In such an instance, the subscriber in network 190-2 transmits a request to server resource 140 to retrieve the content 110 as an adaptive bit rate data stream. In response to receiving the request, the server resource 140 accesses corresponding tiered content associated with content 110 (e.g., tiered content can be available for content 110 in a manner as previously discussed for content 112) to produce the adaptive bit rate data stream. The server resource 140 forwards the adaptive bit rate data stream 115-2 over an available multi-stream data channel 135 as previously discussed.

As mentioned, the distribution resource 150 can be configured to receive and re-transmit the multi-stream data channel 135 to subscribers 108 or de-multiplex the multi-stream data channel 135 and transmit the individual data streams in the multi-stream data channel to the subscribers 108. Thus, embodiments herein can include multicasting requested content in a switched digital video application via an adaptive bit rate data stream as well as a non-adaptive bit rate data stream.

Note that the content 110 transmitted as the adaptive bit rate data stream 115-2 can be transmitted in accordance with linear television programming. For example, if the subscriber 108-1 requests to view the content 110 at 6:15 pm, the server resource 140 transmits the content 110 as the adaptive bit rate data stream 115-2 in a same time frame of content as if the requested content were streamed starting at 6:00 pm. Each additional subscriber tuning to the adaptive bit rate data stream would be able to retrieve and view the same content as the first subscriber 108-1 requesting to view the content 110 at the adaptive bit rate. Assuming the content 110 is transmitted at the standard rate as well, each of the subscribers 108 can tune to the non-adaptive bit rate data stream 115-1 to view the respective content 110.

In certain cases, a subscriber may tune to receive the different formats of content available on the multi-stream data channel 135 depending on a respective playback device. For example, a user may operate a set-top box and corresponding television to retrieve and playback the content 110 according to the standard format (e.g., non-adaptive bit rate data stream 115-1. Alternatively, the user may execute an application on a home computer device or mobile device to retrieve and playback the content 110 according to the tiered format (e.g., adaptive bit rate data stream 115-2).

Note that, in alternative embodiments, any of the content as discussed herein can be available as on-demand type of data that is available at any time as opposed to be available only in a linear programming format. For example, the adaptive bit rate data stream 115-2 can represent on-demand content that is distributed to subscribers 108 in response to a particular subscriber requesting the content for viewing. In such an instance, the server resource includes the adaptive bit rate data stream in a multi-stream data channel having appropriate available bandwidth in response to receiving a request to view selected on-demand content.

Note that further permutations of the embodiments include distributing the content and any of the data streams as discussed herein as switched digital content and/or non-switched digital content. As mentioned, transmitting content as switched digital video can save on bandwidth as the requested content need not be transmitted to members of a respective service group unless at least one subscriber is currently tuned to receive such content.

As mentioned above, the server resource 140 can be configured to populate the multi-stream data channel 135 with the adaptive bit rate data stream 115-2 in response to a trigger event such as a subscriber in a cable network environment requesting to view particular content in accordance with an adaptive bit rate format. In certain cases, in response to another trigger condition, such as a notification indicating that no subscribers in the respective service group are currently tuned to receive particular content, the server resource 140 can be configured to discontinue including and/or transmitting a respective data stream in the multi-stream data channel 135.

Discontinuing transmission of a data stream on the multi-stream data channel 135 can result in freeing up of available bandwidth in the multi-stream data channel 135 for transmission of another data stream. Additionally, the newly available bandwidth can be used to increase a level of quality and/or bit rate of an adaptive bit rate data stream currently transmitted on the multi-stream data channel 135. For example, in response to terminating inclusion of a given data stream in the multi-stream data channel 135 resulting in freeing of bandwidth in the multi-stream data channel 135, embodiments herein include increasing a level of quality (or bit rate) of the portions of content included in the adaptive bit rate data stream 115-2 in the multi-stream data channel 135 based on the newly available bandwidth. In other words, the freed up bandwidth (as a result of dropping of a data stream) can be used to increase a level of quality (or bit rate) of segments of content included in the adaptive bit rate data stream 115-2.

Figure 7:
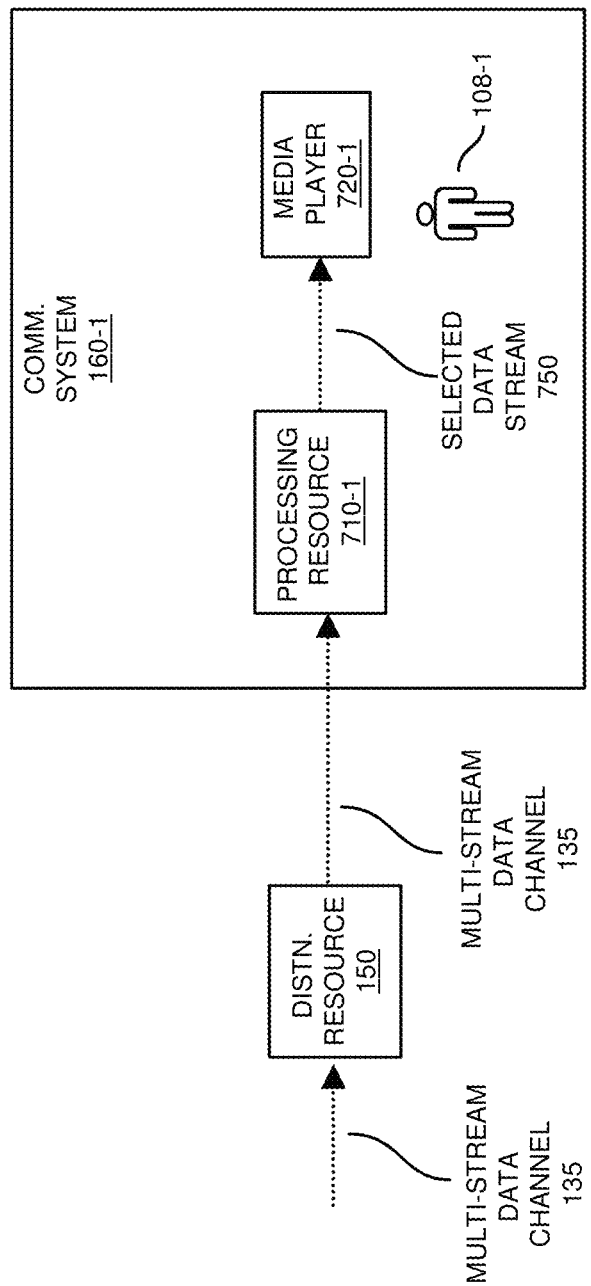
FIG. 7 is an example diagram illustrating transmission and processing of a multi-stream data channel in a network environment according to embodiments herein.

FIG. 7 is an example diagram illustrating transmission and processing of a multi-stream data channel in a network environment according to embodiments herein.

As shown, the distribution resource 150 receives one or more multi-stream data channels including multi-stream data channel 135 as transmitted over network 190-1. In this example embodiment, the distribution resource 150 re-transmits, multicasts, or broadcasts the multi-stream data channel 135 to a processing resource 710-1 in the communication system 160-1 operated by the subscriber 108-1 in a respective home environment. The processing resource 710-1 can be a set-top box (e.g., Hydra) located in a residence of the subscriber 108-1.

In one embodiment, the processing resource 710-1 (e.g., a gateway processing resource) receives selection of a data stream the subscriber 108-1. The processing resource 710-1 retrieves the selected data stream 750 from the data streams available in multi-stream data channel 135 and forwards the selected data stream over a home network to the media player 720-1. Media player 720-1 includes any of one or more decoders to playback a rendition of selected content retrieved from the multi-stream data channel 135.

In one embodiment, the processing resource 710-1 is a gateway resource that translates the received multi-stream data channel 135. For example, the processing resource 710-1 converts multicast content in the multi-stream data channel 135 into unicast type content. A respective gateway resource in a subscriber domain then transmits the unicast content (e.g., in accordance with an Ethernet protocol) to one or more play back devices in, for example, a respective subscriber domain (i.e., communication system 160-1).

Figure 8:
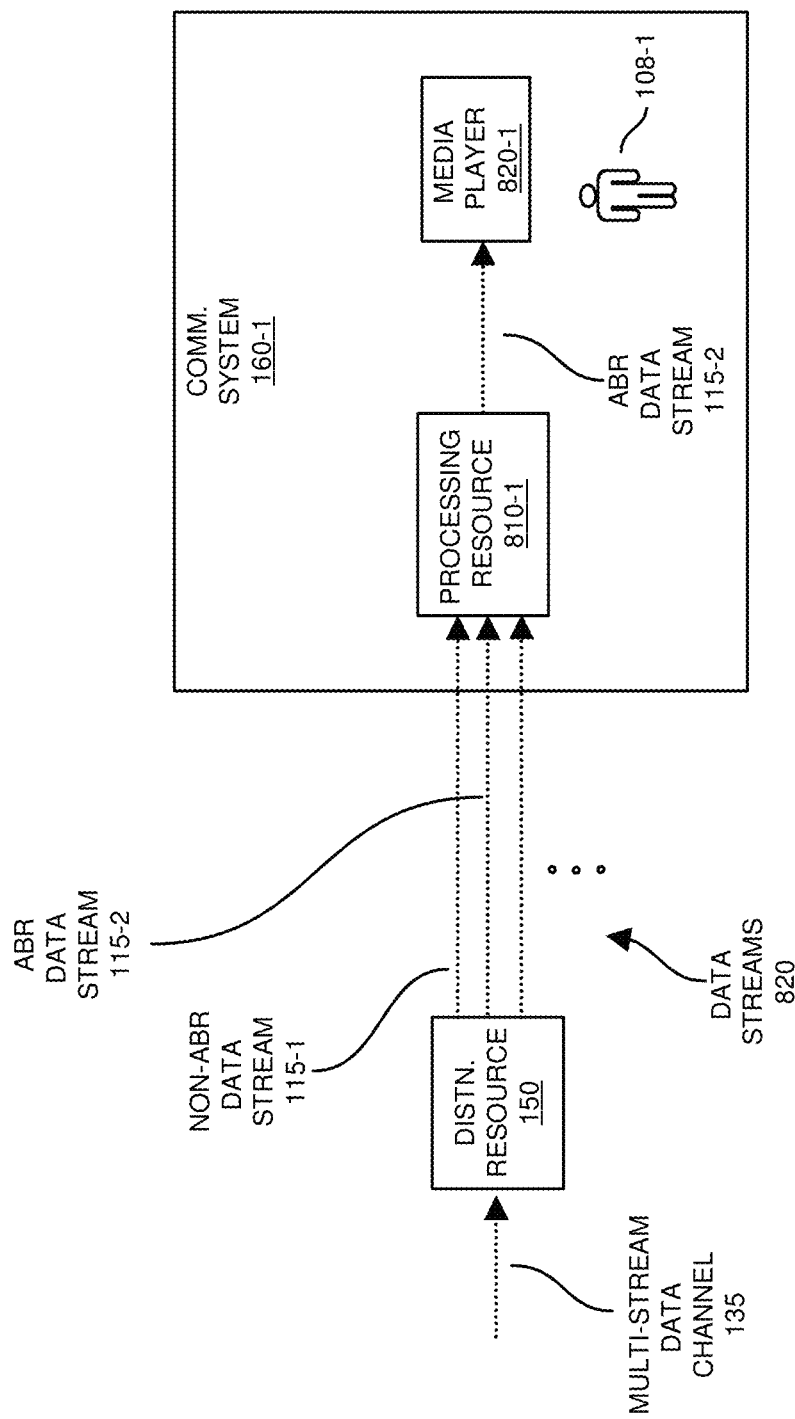
FIG. 8 is an example diagram illustrating transmission and processing of a multi-stream data channel in a network environment according to embodiments herein.

FIG. 8 is an example diagram illustrating transmission and processing of a multi-stream data channel in a network environment according to embodiments herein.

As shown, the distribution resource 150 such as an edge server receives one or more multi-stream data channels. Assume in this example that the distribution resource 150 receives multi-stream data channel 135 over network 190-1. In one embodiment, the server resource 140 provides distribution resource 150 with appropriate information needed to tune to and receive the multi-stream data channel 135 over network 190-1.

In this example embodiment, the distribution resource 150 de-multiplexes the multi-stream data channel 135 into data streams 820. In one embodiment, the distribution resource 150 transmits the data streams 820 in accordance with the DOCSIS (Data Over Cable Service Interface Specification) standard to the processing resource 810-1. In this example, the transmitted data streams 820 include adaptive bit rate data stream 115-2, non-adaptive bit rate data stream 115-1, etc.

The processing resource 810-1 such as a cable modem and/or set-top box device receives one or more of the data streams 820 from the distribution resource 150 and forwards a selected data stream (e.g., adaptive bit rate data stream 115-2) of data streams 820 to a media player 820-1 in the subscriber domain. Media player 820-1 can include any of one or more decoders to decode a selected data stream amongst data streams 820 received from the edge resource 150 and playback a rendition of selected content.

As discussed above, FIGS. 8 and 9 illustrate different ways in which an end device such as a media player can receive a data stream conveyed on a multi-stream data channel. It should be noted that, in accordance with one embodiment, a resource such as a media player operated by a respective subscriber can be configured to receive a selection from the subscriber for particular content to play back on the media player.

Assume that the subscriber 108-1 in this example selects playback of the content 112 at an adaptive bit rate. In response to receiving the request, the media player retrieves content access information 122 (e.g., a so-called manifest) from an appropriate resource in network environment 100. The media player processes the content access information 122 to identify the different network addresses or locations from which to retrieve encoded segments of content for inclusion in the adaptive bit rate data stream 115-2.

In one embodiment, the media player generates and transmits HTTP get requests to server resource 140 to retrieve different segments of the available content at different levels of quality. In response to receiving such requests, the server resource 140 populates the adaptive bit rate data stream 115-2 included in multi-stream data channel 135 with the requested segments of encoded content. In accordance with the example embodiment as discussed above for FIG. 1, a respective media player operated by a subscriber can specify which level of quality of tiered content 112-1 to include for each of the segments included in the adaptive bit rate data stream 115-2.

FIG. 9 is an example diagram illustrating content access information according to embodiments.

By way of a non-limiting example, content access information 122 indicates the different bit rates (e.g., levels of quality) for the encoded content 112-1 that are available for retrieval as well as the different network addresses from which the content 112-1 can be retrieved. In other words, the segments of content encoded at different levels of quality from streams of data 320 can be retrieved form different network addresses as specified by the content access information 122.

In this example, assume that all levels of quality ABR1-ABR10 are available for transmission in an adaptive bit rate data stream derived from content 112. In one example embodiment, the content access information 122 indicates, to the subscriber and/or media player (or other resource in communication system 160-1), that: segments of the tiered content 112-1 encoded at the highest level of quality (e.g., ABR1) can be retrieved via use of a first network address such as URL #1 (Uniform Resource Locator #1); segments of the content 112-1 encoded at the next lower level of quality (e.g., ABR2) can be retrieved via use of a second network address such as URL #2 (Uniform Resource Locator #2); segments of the content 112-1 encoded at the next lower level of quality (e.g., ABR3) can be retrieved via use of a network address such as URL #3 (Uniform Resource Locator #3); and so on.

In addition to use of the network addresses to retrieve segments of the content, the media player requesting the segments of content 112 encoded at different levels of quality over time can provide request information indicating which of one or more segment of the encoded content (e.g., segment #1, segment #2, segment #3, etc.) is to be forwarded to the decoder in the media player at a particular time.

In addition to network address information, and other playback information, content access information 122 can further include appropriate encryption key information enabling a respective subscriber to decrypt content for play back purposes.

As mentioned, the rate of transmitting the sequence of segments in the adaptive bit rate data stream 115-1 can vary depending on one or more parameters such as: the availability of bandwidth in a respective multi-stream data channel 135, the ability of a decoder in the media player to store and/or process the received data stream 115, etc.

In one embodiment, a decoder device (in a respective media player) that decodes the received data stream 115-2 monitors one or more parameters associated with the media player such as: an amount of available memory to store the adaptive bit rate data stream 115-2, available CPU time, rate of consumption of the data stream 115, etc., to make a determination of which level of quality or bit rate to retrieve subsequent segments of the encoded content. The decoder device requests the segments to be included in the adaptive bit rate data stream 115-2 depending on the one or more parameters.

Thus, via retrieval of different segments of content at different levels of quality as controlled by the media player, the adaptive bit rate data stream 115-2 can be a unicast-type data stream requested for viewing by a subscriber. In such an instance, the server resource "multicasts" the adaptive bit rate data stream as a unicast-type data stream in the multi-stream data channel 135 over the network to multiple subscribers 108 in the cable network environment. In other words, a subscriber operating the media player can request (and control retrieval of) a unicast-type data stream for playback on a respective media player. Once received on the shared medium such as a cable network media, the other subscribers in a service group having access to the content available on the shared medium (and that also subscribe to the multi-stream data channel 135) can retrieve and playback the available unicast-type data stream transmitted over the multi-stream data channel 135. Thus, embodiments herein include transmitting unicast content in a multicast channel to one or more members in a shared network environment such as a cable network.

Figure 10:
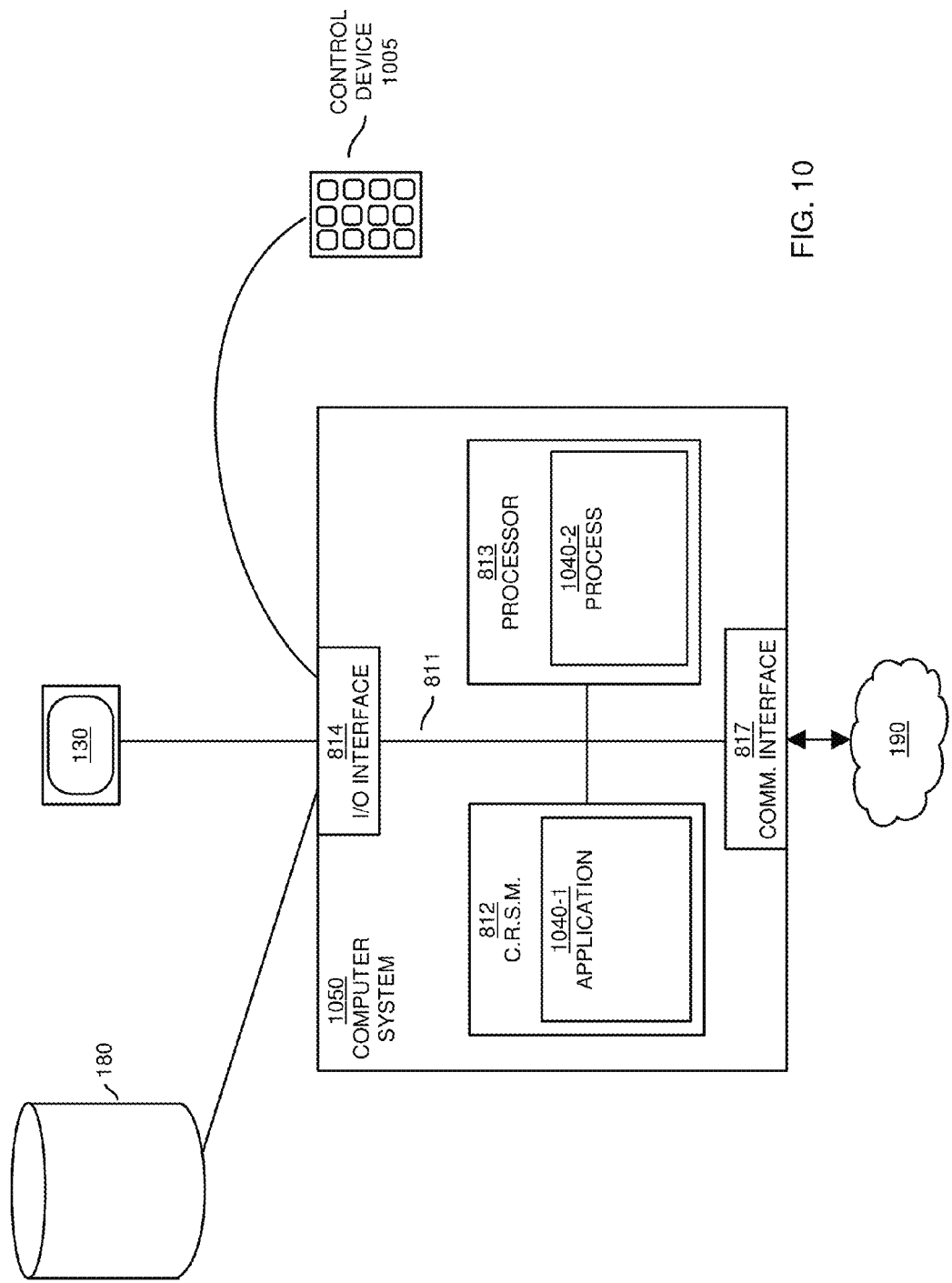
FIG. 10 is a diagram illustrating an example hardware architecture including a processor and an encoded hardware storage medium to carry out any of the processing operations, methods, etc., according to embodiments herein.

FIG. 10 is an example block diagram of a computer system for implementing any of the operations as discussed herein according to embodiments herein.

Computer system 1050 can reside in any of the resources as discussed herein such as server resource 140, distribution resource 150, communication systems 160, etc.

As shown, computer system 1050 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to one or more repository 180 and, if present, other devices such as a playback device 130, keypad 1005, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 150 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with application 1040-1 (e.g., software, firmware, etc.) executed by processor 813. Application 1040-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in application 1040-1 stored on computer readable storage medium 812.

Execution of the application 1040-1 produces processing functionality such as process 1040-2 in processor 813. In other words, the process 1040-2 associated with processor 813 represents one or more aspects of executing application 1040-1 within or upon the processor 813 in the computer system 1050.

Those skilled in the art will understand that the computer system 1050 can include other processes and/or software and hardware components, such as an operating system that controls allocation and use of hardware resources to execute application 1040-1.

In accordance with different embodiments, note that computer system may be any of various types of devices, including, but not limited to, a set-top box, a television, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 11-14. Note that the steps in the flowcharts below can be executed in any suitable order.

Figure 11:
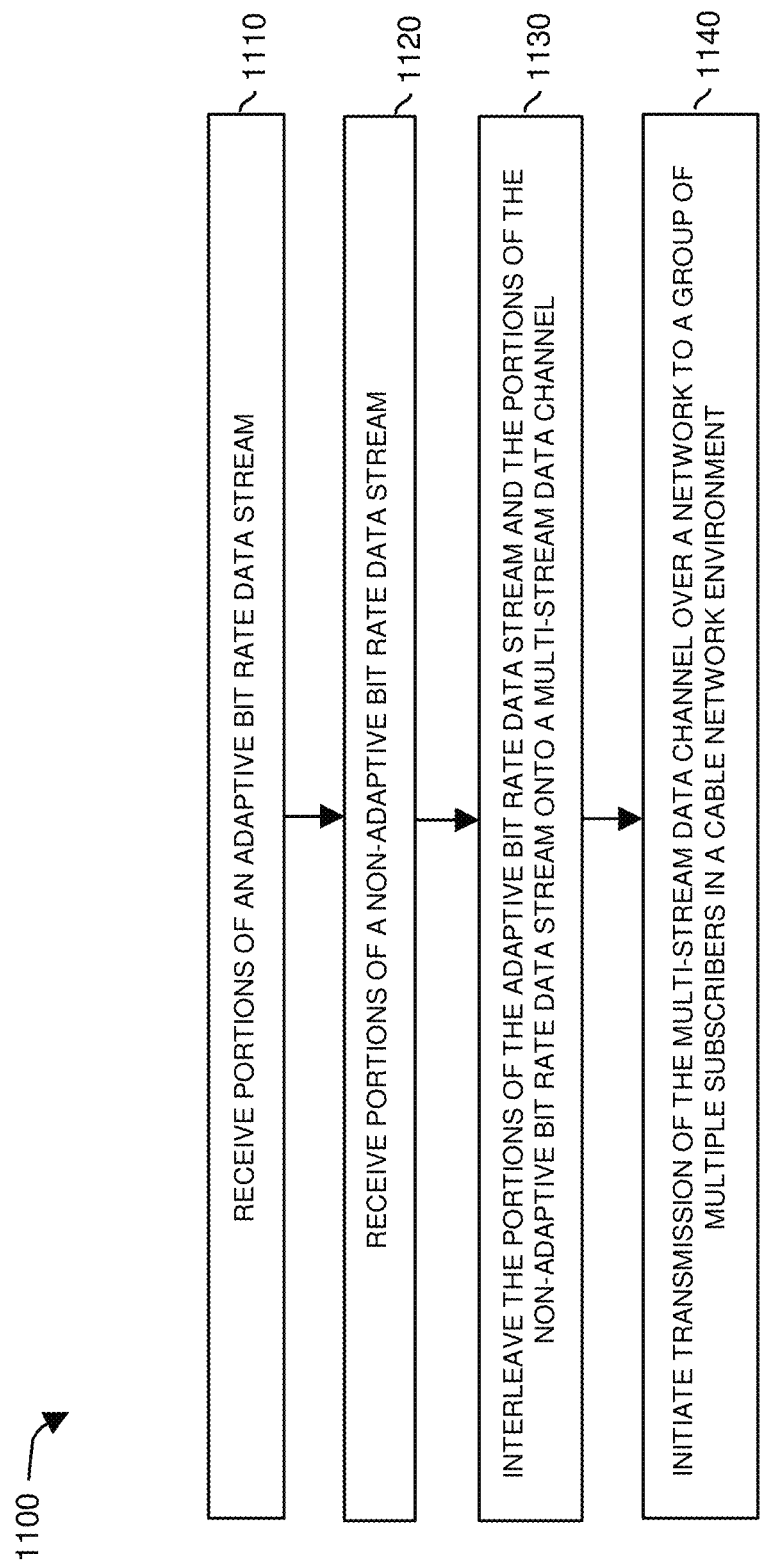
FIGS. 11-14 are flowcharts illustrating example methods according to embodiments herein.

FIG. 11 is a flowchart 1100 illustrating an example method of distributing encoded content according to embodiments. Note that there will be some overlap with respect to concepts as discussed above.

In step 1110, the server resource 140 receives portions of an adaptive bit rate data stream 115-2.

In step 1120, the server resource 140 receives portions of a non-adaptive bit rate data stream 115-1.

In step 1130, the server resource 140 interleaves the portions of the adaptive bit rate data stream 115-2 and the portions of the non-adaptive bit rate data stream 115-1 onto a multi-stream data channel 135.

In step 1140, the server resource 140 initiates transmission of the multi-stream data channel 135 over a network 190-1 to a group of multiple subscribers 108 in a cable network environment.

Figure 12:
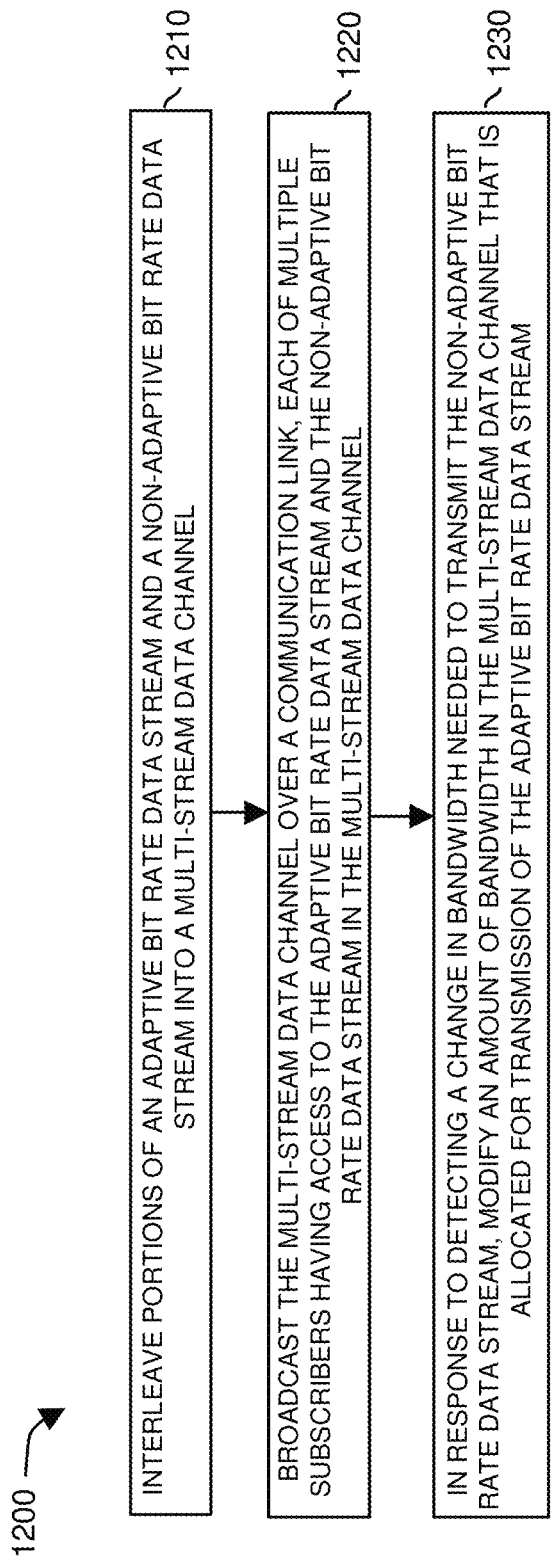

FIG. 12 is a flowchart 1200 illustrating an example method of distributing encoded content according to embodiments. Note that there will be some overlap with respect to concepts as discussed above.

In step 1210, the server resource 140 interleaves portions of the adaptive bit rate data stream 115-2 and the non-adaptive bit rate data stream 115-1 into the multi-stream data channel 135.

In step 1220, the server resource 140 broadcasts the multi-stream data channel 135 over a communication link in network 190-1 to distribution resource 150. Each of multiple subscribers 108 has access to the adaptive bit rate data stream 115-2 and the non-adaptive bit rate data stream 115-1 in the multi-stream data channel.

In step 1230, in response to detecting a change in bandwidth needed to transmit the non-adaptive bit rate data stream 115-1, the server resource 140 modifies an amount of bandwidth in the multi-stream data channel 135 that is allocated for transmission of the adaptive bit rate data stream 115-2.

Figure 13:
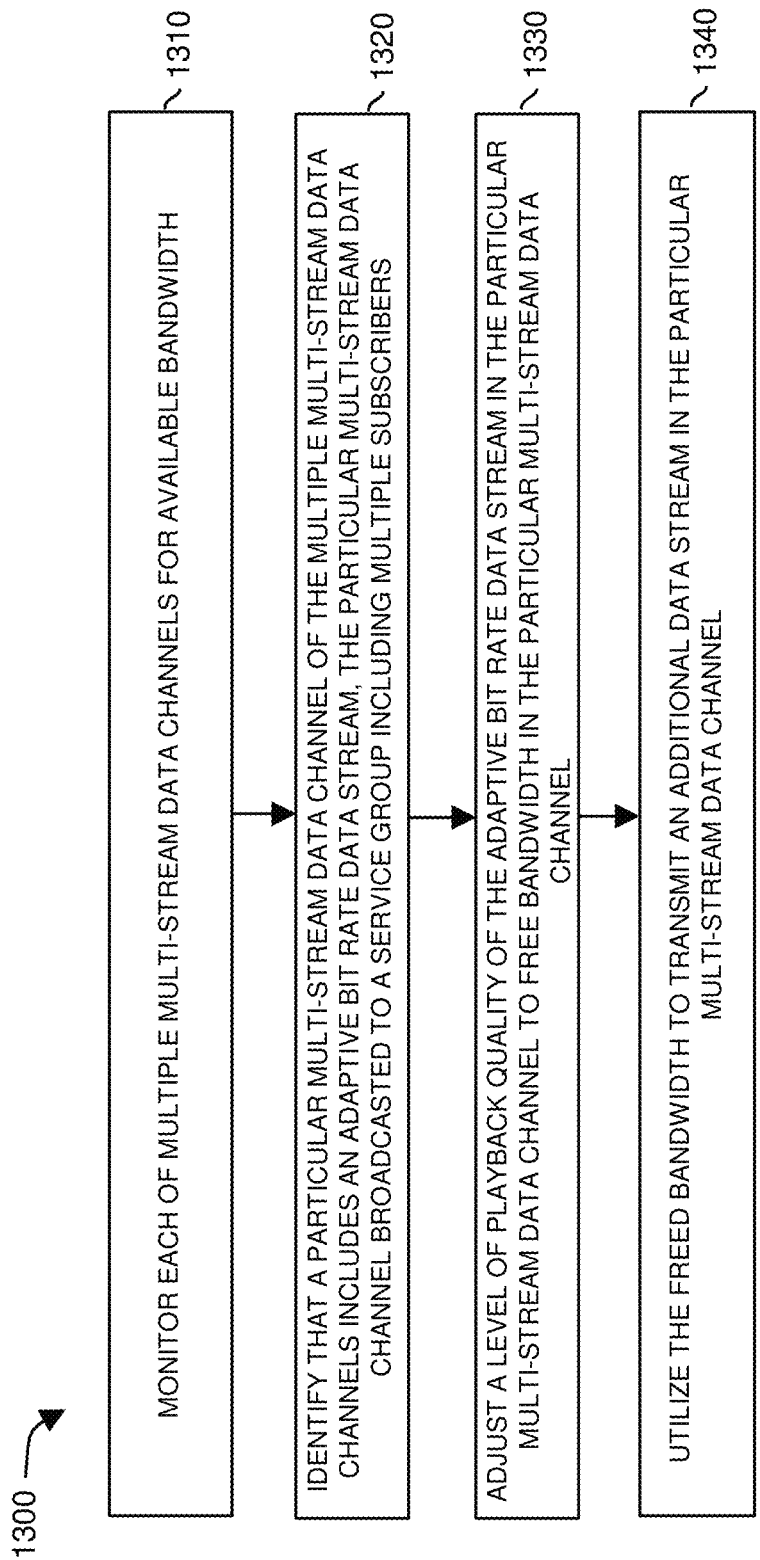

FIG. 13 is a flowchart 1300 illustrating an example method of distributing encoded content according to embodiments. Note that there will be some overlap with respect to concepts as discussed above.

In step 1310, the server resource 140 monitors each of multiple multi-stream data channels for available bandwidth.

In step 1320, the server resource 140 identifies that a particular multi-stream data channel 135 of the multiple multi-stream data channels includes an adaptive bit rate data stream 115-2, the particular multi-stream data channel 135 broadcasted to a service group including multiple subscribers 108.

In step 1330, the server resource 140 adjusts a level of playback quality of the adaptive bit rate data stream 115-2 in the particular multi-stream data channel to free bandwidth in the particular multi-stream data channel 135.

In step 1340, the server resource 140 utilizes the freed bandwidth to transmit an additional data stream (e.g., an adaptive bit rate display screen and/or a non-adaptive bit rate display screen) in the particular multi-stream data channel 135.

Figure 14:
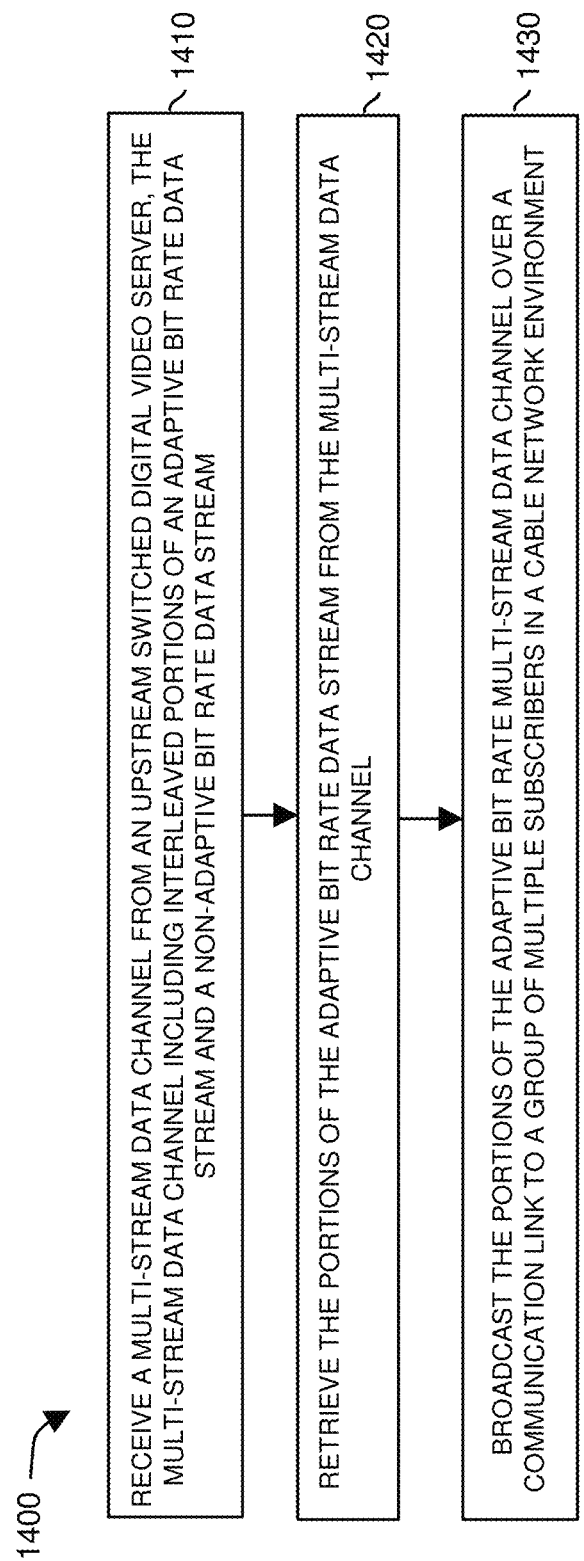

FIG. 14 is a flowchart 1400 illustrating an example method of distributing encoded content according to embodiments. Note that there will be some overlap with respect to concepts as discussed above.

In step 1410, the distribution resource 150 receives a multi-stream data channel 135 from an upstream switched digital video server (e.g., server resource 140). The multi-stream data channel 135 includes interleaved portions of at least an adaptive bit rate data stream 115-2 and a non-adaptive bit rate data stream 115-1.

In step 1420, the distribution resource 150 retrieves the portions of the adaptive bit rate data stream 115-2 from the multi-stream data channel 135.

In step 1430, the distribution resource 150 broadcasts the portions of the adaptive bit rate multi-stream data channel 135 over a communication link in network 190-2 to a group of multiple subscribers 108 in a cable network environment.

Note again that techniques herein are well suited for distributing content in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
via computer processor hardware at a content distribution resource, performing operations of:
receiving portions of a non-adaptive bit rate data stream;
receiving portions of an adaptive bit rate data stream, the portions of the adaptive bit rate data stream selected from content encoded at multiple different bit rates, each of the multiple different bit rates supporting different levels of playback quality;
adjusting levels of quality of encoded segments of content included in the adaptive bit rate data stream in response to changes in an amount of bandwidth needed to convey the non-adaptive bit rate data stream over the multi-stream data channel; and
interleaving the portions of the adaptive bit rate data stream and the portions of the non-adaptive bit rate data stream onto a multi-stream data channel; and
initiating transmission of the multi-stream data channel over a network to a group of multiple subscribers in a cable network environment.

2. The method as in claim 1, wherein the multi-stream data channel is allocated as a multi-stream, switched digital video channel to convey switched digital content to the group of multiple subscribers.

3. The method as in claim 1 further comprising:
populating the multi-stream data channel to include the adaptive bit rate data stream in response to a client requesting to view the content in an adaptive bit rate format.

4. The method as in claim 1 further comprising:
selecting amongst the content encoded at multiple different bit rates to produce the adaptive bit rate data stream;
wherein receiving the portions of the non-adaptive bit rate data stream includes retrieving a sequence of content segments, each of the content segments encoded in accordance with a respective pre-established bit rate.

5. The method as in claim 1 further comprising:
initiating distribution of the adaptive bit rate data stream and the non-adaptive bit rate data stream as switched video content to each subscriber in the group of multiple subscribers in the cable network environment in response to at least one of the subscribers in the group requesting to retrieve the adaptive bit rate data stream.

6. The method as in claim 1 further comprising:
producing the multi-stream data channel as a QAM (Quadrature Amplitude Modulated) signal including the portions of the adaptive bit rate data stream and the portions of the non-adaptive bit rate data stream; and
broadcasting the QAM signal over the network to the group of multiple subscribers in the cable network environment, the group including multiple different subscribers having simultaneous access to the adaptive bit rate data stream and the non-adaptive bit rate data stream in the QAM signal.

7. The method as in claim 1 further comprising:
adjusting a level of quality of encoded data in the adaptive bit rate data stream depending on availability of excess bandwidth in the multi-stream data channel.

8. The method as in claim 1 further comprising:
in response to terminating inclusion of a given data stream in the multi-stream data channel resulting in freeing of bandwidth in the multi-stream data channel, increasing a level of quality of the portions of content included in the adaptive bit rate data stream in the multi-stream data channel.

9. The method as in claim 1, wherein the adaptive bit rate data stream is a unicast-type data stream, the method further comprising:
multicasting the unicast-type data stream in the multi-stream data channel over the network to the multiple subscribers in the cable network environment.

10. The method as in claim 9,
wherein the non-adaptive bit rate data stream included in the multi-stream data channel is encoded to playback a rendition of the content in accordance with at least one predetermined level of quality regardless of a presence of the congestion in the cable network environment.

11. The method as in claim 1 further comprising:
initiating distribution of data stream information indicating addresses in which to retrieve the portions of the adaptive bit rate data stream, the addresses specifying different locations from which to retrieve segments of the content encoded according to different levels of playback quality; and
retrieving the portions of the adaptive bit rate data stream in response to receipt of a request from a subscriber in the group.

12. The method as in claim 1, wherein the adaptive bit rate data stream in the multi-stream data channel is made available to the multiple subscribers during a pre-scheduled time slot during which at least one of the multiple subscribers selects playback of the adaptive bit rate data stream for playback; and
wherein interleaving the portions of adaptive bit rate data stream into the multi-stream data channel further comprises including the portions of the adaptive bit rate data stream in accordance with linear television programming.

13. The method as in claim 1 further comprising:
prior to the interleaving, initially transmitting the non-adaptive bit rate data stream in the multi-stream data channel to the group of multiple subscribers in the cable network environment; and
in response to receiving a request from one of the multiple subscribers to view particular content in accordance with an adaptive bit rate, interleaving the adaptive bit rate data stream with the non-adaptive bit rate data stream in the multi-stream data channel.

14. The method as in claim 1 further comprising:
interleaving the adaptive bit rate data stream in the multi-stream data channel in response to receiving a request from a subscriber in the group to view particular content, the adaptive bit rate data stream available for retrieval by each of the subscribers in the group.

15. The method as in claim 1, wherein receiving portions of an adaptive bit rate data stream to include in the multi-stream data channel occurs in response to receiving a request to view on-demand content, the adaptive bit rate data stream representing the requested on-demand content.

16. The method as in claim 1 further comprising:
receiving the multi-stream data channel as switched digital video conveyed to multiple subscribers in the cable network environment.

17. The method as in claim 1 further comprising:
adjusting a level of playback quality associated with the adaptive bit rate data stream in the multi-stream data channel to free bandwidth in the multi-stream data channel; and
utilizing the freed bandwidth to transmit an additional data stream in the multi-stream data channel.

18. The method as in claim 1, wherein the adaptive bit rate data stream is a first video stream; and
wherein the non-adaptive bit rate data stream is a second video stream.

19. The method as in claim 18, wherein the segments of the content encoded at the multiple different bit rates includes:
a first segment of content encoded in accordance with a first playback bit rate and a second playback bit rate; and
a second segment of content encoded in accordance with the first playback bit rate and the second playback bit rate.

20. The method as in claim 19, wherein the received portions of the adaptive bit rate data stream includes a first portion and a second portion; and
wherein receiving the portions of the adaptive bit rate data stream further comprises:
selecting the first segment of the content encoded in accordance with the first playback bit rate as the first portion included in the adaptive bit rate data stream; and
selecting the second segment of the content encoded in accordance with the second playback bit rate as the second portion included in the adaptive bit rate data stream, the first playback bit rate greater than the second playback bit rate.

21. The method as in claim 20, wherein the first portion and the second portion are chosen for inclusion in the multi-stream data channel depending upon available bandwidth in the multi-stream data channel leftover after including the non-adaptive bit rate data stream in the multi-stream data channel.

22. The method as in claim 21, wherein initiating transmission of the multi-stream data channel over the network further comprises:
broadcasting the multi-stream data channel over the network.

23. The method as in claim 1 further comprising:
selecting the portions of the adaptive bit rate data stream from sequential segments of the content encoded at different bit rates, the portions selected for inclusion in the multi-stream data channel depending upon available bandwidth in the multi-stream data channel leftover from including the portions of the non-adaptive bit rate data stream in the multi-stream data channel.

24. The method as in claim 1 further comprising:
wherein a given subscriber of the multiple subscribers selects segments of the content to be included in the adaptive bit rate data stream.

25. A method comprising:
receiving an adaptive bit rate data stream;
receiving a non-adaptive bit rate data stream;
interleaving portions of the adaptive bit rate data stream and portions of the non-adaptive bit rate data stream into a multi-stream data channel, the portions of the adaptive bit rate data stream including segments of video content encoded at multiple different bit rates, each of the multiple different bit rates supporting different levels of playback quality;
broadcasting the multi-stream data channel over a communication link, each of multiple subscribers having access to the adaptive bit rate data stream and the non-adaptive bit rate data stream in the multi-stream data channel; and
in response to detecting a change in bandwidth needed to transmit the non-adaptive bit rate data stream, modifying an amount of bandwidth in the multi-stream data channel that is allocated for transmission of the adaptive bit rate data stream; and
adjusting levels of quality of encoded segments of content included in the adaptive bit rate data stream in response to changes in an amount of bandwidth used to convey the non-adaptive bit rate data stream over the multi-stream data channel.

26. The method as in claim 25 further comprising:
in response to detecting an increase in available bandwidth on the multi-stream data channel as a result of a decrease in bandwidth needed to transmit the non-adaptive bit rate data stream, transmitting additional portions of the adaptive bit rate data stream on the multi-stream data channel in accordance with a higher level of playback quality.

27. The method as in claim 25 further comprising:
in response to detecting a decrease in available bandwidth on the multi-stream data channel as a result of an increase in bandwidth needed to transmit the non-adaptive bit rate data stream, transmitting the adaptive bit rate data stream on the multi-stream data channel in accordance with a lower level of playback quality.

28. The method as in claim 25, wherein the adaptive bit rate data stream in the multi-stream data channel supports playback of content according to different levels of quality over time depending on an amount of bandwidth of the multi-stream data channel that is allocated to the adaptive bit rate data stream; and
wherein the non-adaptive bit rate data stream in the multi-stream data channel supports playback of content according to a predetermined level of quality over time.

29. The method as in claim 25, wherein interleaving the portions of the adaptive bit rate data stream and the non-adaptive bit rate data stream into the multi-stream data channel includes:
selecting the portions of the adaptive bit rate data stream amongst multiple encoded versions of content depending on bandwidth availability in the multi-stream data channel, each of the multiple encoded versions of content supporting playback of the content according to a different respective level of quality.

30. The method as in claim 25, wherein the multi-stream data channel has fixed available bandwidth in which to transmit switched video content to a service group of multiple subscribers in a cable network environment.

31. A network node comprising:
a processor; and
a hardware storage resource coupled to the processor, the hardware storage resource storing instructions that, when executed by the processor, cause the network node to perform the operations of:
receiving portions of a non-adaptive bit rate data stream;

receiving portions of an adaptive bit rate data stream, the portions of the adaptive bit rate data stream selected from content encoded at multiple different bit rates, each of the multiple different bit rates supporting different levels of playback quality;

adjusting levels of quality of encoded segments of content included in the adaptive bit rate data stream in response to changes in an amount of bandwidth needed to convey the non-adaptive bit rate data stream over the multi-stream data channel;

interleaving the portions of the adaptive bit rate data stream and the portions of the non-adaptive bit rate data stream onto a multi-stream data channel; and initiating transmission of the multi-stream data channel over a network to a group of multiple subscribers in a cable network environment.

32. Computer-readable storage hardware having instructions stored thereon, the instructions, when carried out by a processing device, causes the processing device to perform operations of:

receiving portions of a non-adaptive bit rate data stream;

receiving portions of an adaptive bit rate data stream, the portions of the adaptive bit rate data stream selected from content encoded at multiple different bit rates, each of the multiple different bit rates supporting different levels of playback quality;

adjusting levels of quality of encoded segments of content included in the adaptive bit rate data stream in response to changes in an amount of bandwidth needed to convey the non-adaptive bit rate data stream over the multi-stream data channel;

interleaving the portions of the adaptive bit rate data stream and the portions of the non-adaptive bit rate data stream onto a multi-stream data channel; and initiating transmission of the multi-stream data channel over a network to a group of multiple subscribers in a cable network environment.

* * * * *